United States Patent [19]

Hambrick et al.

[11] Patent Number: 5,836,011
[45] Date of Patent: Nov. 10, 1998

[54] IMPLEMENTATION OF TEAMS AND ROLES WITHIN A PEOPLE ORIENTED WORK ENVIRONMENT

[75] Inventors: Geoffrey Martin Hambrick, Round Rock; James Matthew Rowan, Austin, both of Tex.

[73] Assignee: International Business Machines Corporation, Armonk, N.Y.

[21] Appl. No.: 375,767

[22] Filed: Jan. 20, 1995

[51] Int. Cl.$^6$ ................................................ G06F 155/00
[52] U.S. Cl. ......................................... 395/208; 395/209
[58] Field of Search ................................... 395/208, 209; 364/192, 521

[56] References Cited

U.S. PATENT DOCUMENTS

| | | |
|---|---|---|
| 4,205,370 | 5/1980 | Hirtle . |
| 4,809,170 | 2/1989 | Leblang et al. . |
| 4,819,176 | 4/1989 | Ahmed et al. . |
| 4,905,181 | 2/1990 | Gregory . |
| 4,907,167 | 3/1990 | Skeirik . |
| 5,001,628 | 3/1991 | Johnson et al. . |
| 5,005,119 | 4/1991 | Rumbaugh et al. . |
| 5,019,961 | 5/1991 | Addesso et al. .................... 364/192 |
| 5,032,978 | 7/1991 | Watson et al. . |
| 5,032,979 | 7/1991 | Hecht et al. . |
| 5,050,074 | 9/1991 | Marca . |
| 5,062,045 | 10/1991 | Janis et al. . |
| 5,075,845 | 12/1991 | Lai et al. . |
| 5,119,493 | 6/1992 | Janis et al. . |
| 5,128,885 | 7/1992 | Janis et al. . |
| 5,146,586 | 9/1992 | Nakano . |
| 5,226,118 | 7/1993 | Baker et al. . |
| 5,233,688 | 8/1993 | Too . |
| 5,295,062 | 3/1994 | Fukushima . |
| 5,295,242 | 3/1994 | Mashruwaia et al. . |

OTHER PUBLICATIONS

Kramer, "Enhanceable Authorization Mechanism", IBM Technical Disclosure, vol. 30, No. 1, Jun. 1987.
*IBM Technical Disclosure Bulletin,* Jun. 1987, pp. 179–181.
*IBM Technical Disclosure Bulletin,* Oct. 1989, p. 428.
*IBM Technical Disclosure Bulletin,* Mar. 1990, pp. 304–305, 310–311, 327–328 and 444–445.
*IBM Technical Disclosure Bulletin,* Oct. 1991, pp. 31–32.
*IBM Technical Disclosure Bulletin,* Jan. 1992, pp. 138–141.

*Primary Examiner*—Gail O. Hayes
*Assistant Examiner*—Frantzy Poinvil
*Attorney, Agent, or Firm*—George E. Clark, Esq.; Jenkens & Gilchrist; Mark S. Walker, Esq.

[57] ABSTRACT

A method and apparatus for efficiently representing, maintaining and managing a project and enclosed lifecycles in a data processing system used to support a people-oriented work environment. An object-oriented language environment is utilized to represent projects, processes, states, transitions, users, roles, authorities, actors, members and activities as objects. Process, member, and authority objects inherit from project objects. State objects inherit from process objects. Transition objects inherit from state objects. Project and user objects inherit from actor objects.

4 Claims, 25 Drawing Sheets

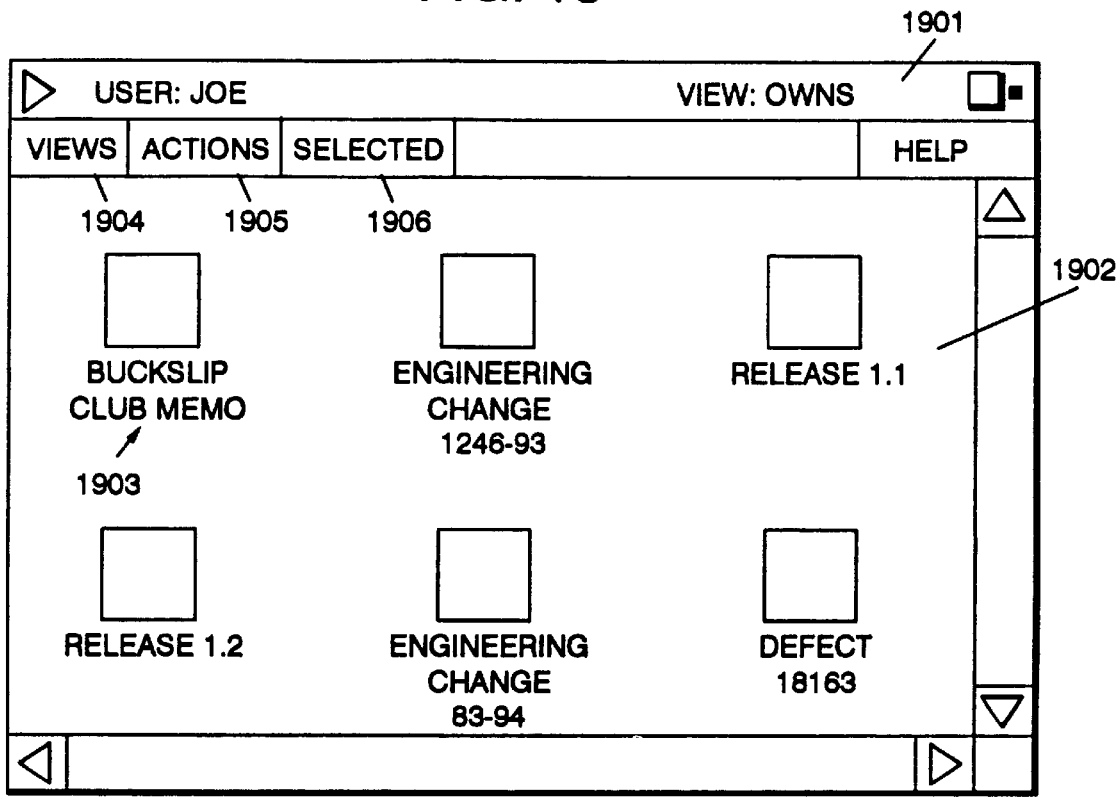

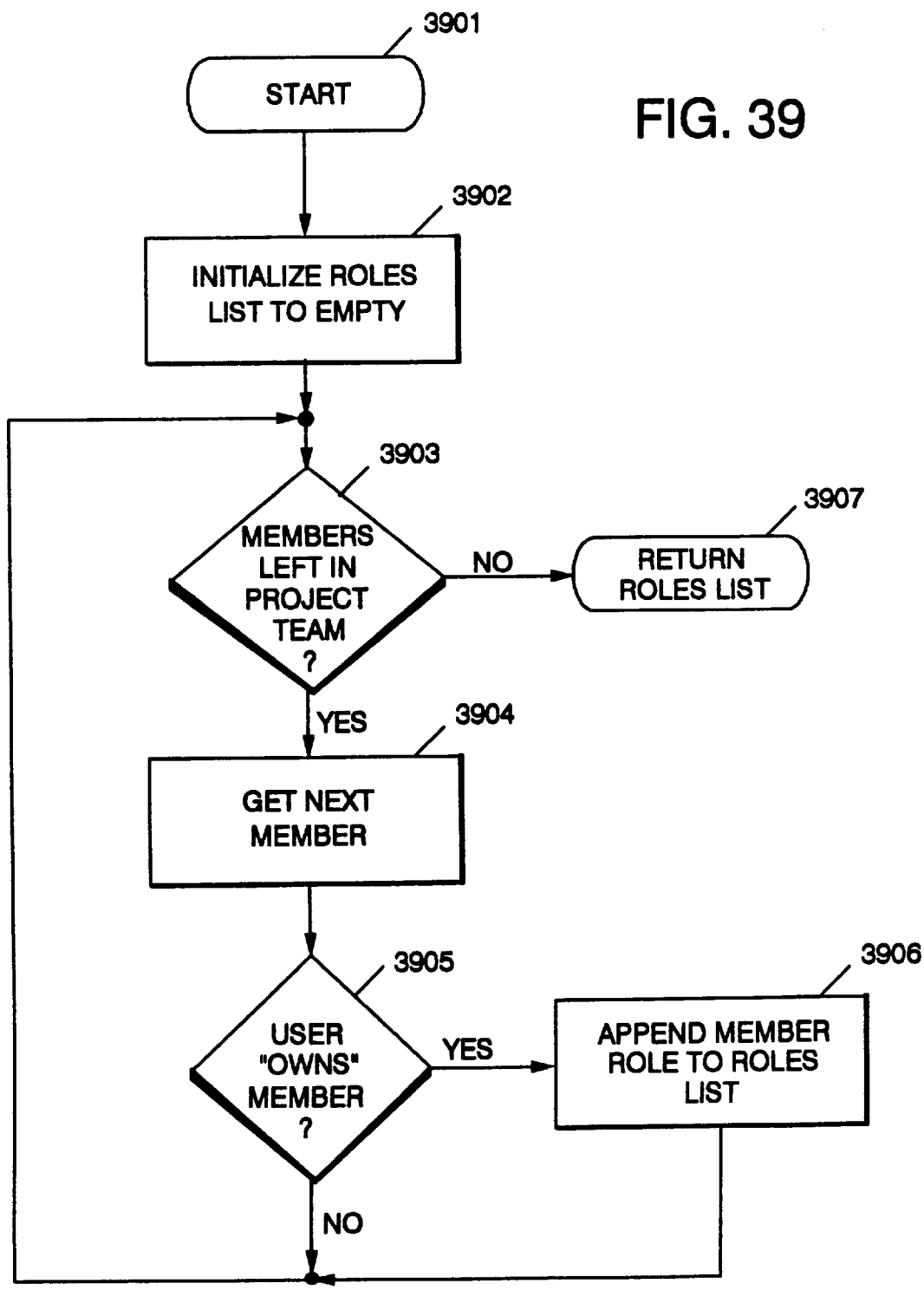

IMPLEMENTATION OF TEAMS AND ROLES WITHIN A PEOPLE ORIENTED WORK ENVIRONMENT

CROSS-REFERENCES

U.S. patent application entitled "COMPUTERIZED GENERAL PURPOSE PROCESS CONTROL SYSTEM AND METHOD SEPARATING TRANSITION POLICY AND STATE CHANGE ACTIONS," Ser. No. 08/123,545 now abandoned U.S. patent application entitled "PROJECT LIFECYCLE MANAGEMENT METHOD AND APPARATUS FOR A PEOPLE ORIENTED WORK ENVIRONMENT TOOL," Ser. No. 08/375,757, now pending filed concurrently herewith, and U.S. patent application entitled "PROJECT MANAGEMENT TOOL FOR A PEOPLE ORIENTED WORK ENVIRONMENT," Ser. No. 08/379,758, now pending filed concurrently herewith, all assigned to a common assignee, are hereby incorporated by reference herein.

TECHNICAL FIELD OF THE INVENTION

The present invention relates to a method and apparatus for efficiently representing, maintaining and managing teams and roles within a data processing system used to support a people oriented work environment.

BACKGROUND OF THE INVENTION

The managing of projects can be a logistical and bureaucratic nightmare. Often the number of people, tasks, their interrelationships, and the policies that govern the work flow within the project may become unwieldy and hinder the successful progress of the project.

Furthermore, the persons involved in the project may not fully understand their responsibilities, and may be confused as to which company policies apply to their assigned duties. This uncertainty and confusion may cause additional delays and/or result in a poor quality job and/or product.

Furthermore, those responsible for staffing a project may not fully understand the skills needed in the project, and therefore may hire/reassign/fire the wrong individuals, causing even more delays and poor quality.

Such a problem has been recognized by certain organizations, and has resulted in standards of quality that are not associated with the end product of a given project, but with the process that is used to develop it. One such organization is the International Standards Organization (ISO), and its standard: ISO 9000, is likewise focused on the development process, rather than on the products developed.

The basic idea behind the ISO 9000 standard is that the development process should be:

1) well defined and documented;
2) repeatable and measurable; and
3) the measurements should be used to improve the process.

In theory, improving the ability of the process to detect and remedy errors, and then to prevent them entirely will increase the quality of the products.

In practice this idea is gaining support in an increasingly quality conscious industry. For example, many projects may not be sold in Europe without an ISO 9000 certification. This certification is achieved as the result of an audit of various members of the project team by an independent auditing organization.

Such audits can be very unnerving and time consuming, since many questions are asked and documents are submitted to prove that a member knows what it is they are producing and why, understands and follows steps geared towards managing the quality and uses the performance results to modify (or optimize) the process. Given that a "critical mass" of project team members pass the audit, certification is granted.

With or without such certification requirements, it is still desirable to have some sort of tool or mechanism for monitoring, directing, organizing and managing a project through its life cycle. Many prior art tools have been developed for attempting to assist in a project. Further, with the advent and proliferation of computers, many programs have been written that help to document and manage aspects of a project's work flow and process.

Most prior art tools (for example, the KI Shell, Version 1.1, September 1990, developed by Universal Energy Systems, Inc, Dublin, Ohio) are "process" oriented in their approach to project support. That is, process oriented tools concentrate on the activities and the control flows between them. For example, a process oriented approach to developing a software system might include activities such as:

a) analysis;
b) design;
c) code;
d) test; and
e) deliver. Tools that support a process (or "method") oriented approach would provide means for these activities to be defined that capture the activities that cause the project to flow from one state to another. For example, as a result of the test activity, the next activity might be "deliver" (if there are no major problems), or "code", "design" or "analysis" (depending on the kind of problems found).

A disadvantage of this approach, not only from a certification perspective, but from the point of view of a project team member trying to optimize the process and reduce costs, is that there is no way to distinguish between those activities that resulted in a high quality output and those where the results required rework. In other words, there is a need to be able to track both "forward" and "backward" movement through the process in order to optimize it.

A simplistic solution to this is to add an attribute to each activity that indicates whether or not it represents "forward" or "backward" motion. However, the problem with this approach is that it tends to clutter up the definition of the lifecycle model with many extra activities. One proposal describes a solution where the "transitions" through the lifecycle are no longer labeled per se, but represent the flow from state to state which is assumed to be bidirectional. Each transition has a separate associated action to cause flow of control forward to the target state, and backward to the source state.

The primary benefit of that solution was to enable the people involved in the process to think of "completing" the work product and moving it to the next state, or "rejecting" the previous person's work as having an error that prevents them from completing it and moving it on in the process. By having a limited number of transitions with very specific meanings, the process becomes much easier to define, follow, manage and optimize.

However, that solution went a step further and solved another problem that exists in prior art systems with respect to they being "frame" based. Frame based activities have all the logic that represents the policy governing (authorizing) the state change actions and the code that causes the change of state together in a single program.

Not only is it harder to specify, test and maintain the larger, more complex programs associated with frame based systems, but also the policy and state change actions are usually "owned" by different people defining the process. Usually, the management teams own the policy authorizing the state change, while the technical teams tend to own the specific actions that cause the change of state. For example, a manager might decide that code must be 90% tested in order to move to the final state, but the technical team would be responsible for defining the "build and package" actions necessary to prepare it for delivery to customers.

A proposed solution was to add a third "program fragment" associated with each transition that represents the "guard" condition that must prevail before the state change can be effected. Also, when control is passed to the next state, a fourth program fragment determined a list of legal "owners" who were responsible for completing the activity associated with that state. Together, the guard condition and owner action served as the foundation for defining the policies associated with a process. Being able to understand and describe the policies is not just required as part of an ISO 9000 certification audit, but is also instrumental to the development of a high quality product. In fact, the ability to optimize a process by preventing backward motion relies more on the ability to strengthen the guard conditions and or tighten control over who maintains ownership than it does on modifying the state change actions. Thus, the expectation was that changes to a process become more and more localized when using that solution.

However, even this "extended" process oriented approach is not enough because the system only tells the project teams what it is they are supposed to do; it does not help them understand why they are doing it in terms of what they are supposed to produce.

A solution to this problem is to take a "work product" oriented approach as embodied in cross-referenced U.S. patent application Ser. No. 08/375,757 referred to earlier. A work product oriented process first focuses on the intermediate deliverables of the project, and treats them each like a separate project that may follow a separate process; then, the process associated with the overall project is designed to bring them together into a final product.

Taking a work product oriented approach to developing a software system, we might see the following three work products:

a) a domain model, that fulfills the functional requirements;

b) an architecture model, that describes how the functional requirements will be designed to resolve customer's performance constraints;

c) an implementation model, that describes how the design will be implemented through source code, build procedures and installation steps for the system on the required target platforms.

These three work products seem to map almost directly into the first three steps shown above in the process oriented approach, and tend to motivate why the steps are ordered in the manner shown above. Since each of these work products may be composed of "sub-components", we could define a separate lifecycle model (process) for each that is followed. For example, a domain model may contain definitions of the inputs, outputs and processing of the functions that will be composed in order to solve the requirements (as mentioned above). Thus, a relatively natural process for developing a function is to have an activity associated with developing the input, output and processing specifications (i.e., the "sub-work products") respectively.

One advantage is that the process associated with a "composite" work product is automatically a composite of the processes associated with its components, along with any specific steps needed to assemble them together and insure that they work.

Another advantage is that work products can be arranged in "hierarchies" such that related work products can inherit both the definitions of and the lifecycle states of those from which they inherit. This makes it very easy to create new kinds of work products with tailored processes, since they only need "override" the definition of the "class" from which they inherit where theirs differs, instead of re-defining it from scratch.

As we used a tool based on the above invention, we examined the changes that occurred to the processes over time. It happened as expected that reuse increased and the state change actions became very stable. However, those actions associated with the guards seemed to change more frequently than one might have expected. Specifically, it turns out that the conditions governing authority a lot to do with "who you are" with respect to the process. For example, a high ranking manager may be given just about absolute authority to do anything. This meant modifying the guards of almost every transition so that when that manager tried to execute the transition, authority was granted.

The situation got even worse, because at one point, the manager went on vacation and assigned a "deputy" to act for him while he was away. This meant changing almost every transition in the system to allow the "deputy" access, but only during the planned vacation period. The programmer assigned to make these modifications was clever enough to add a date check to the condition, so that there was no need to go back after the vacation was over. However, this meant that "impossible" code was executed every time every transition was executed, impacting the performance.

Even without deliberately time dependent code, much of the code associated with a guard is "impossible" because a given person attempting to initiate the transition only activates one branch of the complex, ever growing guard logic that becomes very difficult to maintain and test, as well as taking up extra space in the system.

One solution resolved these problems through a new form of object called an authority that was associated with a person and a transition that maintained an associated condition. Whenever a person attempts to execute a transition using this apparatus, only the appropriate authorities are examined and the code associated with the condition is checked. Since authorities are separate objects, they can have a lifecycle defined, just like any other work product. This means that the owner can give an authority to use the authority (i.e., delegate), and make it conditional. Further, if the condition associated with an authority becomes "impossible", then it can be removed from the system actually increasing performance.

The net effect is that the policies should become almost as stable as the state change actions, only changing (as was desired) in response to optimizing the process to eliminate backward flow. However, there are still problems remaining for which there is a need for a computer implemented tool to solve.

For instance, when the manager of the department changed, it was very unwieldy to go and delete the many authorities associated with one person and add them to another.

Further, prior to assigning any specific responsibilities, it was relatively difficult for the project leader to assign all the required authorities, since this required examining every transition associated with the lifecycle and creating the appropriate authority for the assigned person.

Even further, once the people were given the proper authority, it was difficult for the manager to see who these individuals were and what role they play.

From the person's perspective, it was difficult to separate out various duties with respect to the project, since the authority is associated with a specific transition in the lifecycle. In other words, it was difficult for a person to determine the "teams" to which they belonged.

Also from the person's perspective, it was hard to tell how much time they should allot to any given role, or to see if they were "overloaded" when looking across all the roles that they play.

Further, there was no easy way of documenting and understanding (with the help of the system) exactly what a role is expected to know, in order to help a person gain the skills necessary to better perform their job.

Solving these problems is the purpose of this invention.

SUMMARY OF THE INVENTION

It is an object of the present invention to assist in organizing and managing a project through the use of a computer implemented interface, which defines the teams associated with the projects and the role of project team members in a clear and definite manner.

The present invention is preferably implemented within an object-oriented programming language environment, which organizes the various portions of the present invention into objects. The organization into objects allows ease of programming modifications, and makes it easy to precisely describe the behavior and relationships of system components, as is well known in the art. For a further discussion of object-oriented programming, please refer to *Object-Oriented Technology: A Manager's Guide*, Taylor, D., Addison-Wesley 1994 and *Object-Oriented Analysis and Design*, Booch, G., 2nd Edition, The Benjamin Cummings Publishing Co. 1994, which are hereby incorporated by reference herein.

Objects within this environment may consist of projects, teams, states, persons, roles, authorities, and transitions. Projects represent the work product. Projects have a lifecycle defined by states, the progress through which is governed by the action of transitions. Each transition from one state to the next in the project lifecycle is enabled through a specific authorization, however, unlike the authorization defined in cross-referenced U.S. patent application Ser. No. 08/375,758, in the present invention, authorities are associated with a role and the transition (instead of directly with a person), allowing a person playing that role to cause the transition. Roles are provided by the project and precisely define the responsibility of the agent playing that role. Teams are thus represented by the entire list of roles associated with a project.

Further, projects can be defined by other projects (in order to reuse existing definitions), or be composed of other (sub) projects (to allow a project to be divided into smaller more manageable parts that follow a separate lifecycle). States are a kind of a subproject in their own right, their difference being that they serve to identify the transitions (activities) that can occur within that state of the project (or subproject) lifecycle. Transitions, too, are a special kind of project, that maintain the code necessary to cause the change of state. Authorities are a kind of project that maintain the code necessary to verify conditions that must exist in order for the associated role to be able to cause the associated transition. Finally, roles are a kind of project as well that collect associated authorities.

The present invention preferably provides a computer assisted environment for informing members of the project of what activities they are required to perform. Such information is passed to the project members in any one of various user interface techniques traditionally utilized within computer systems. One such user interface may be a graphical user interface such as a "windows" program, which allows a user to "click" through icons and other various window views in order to determine what tasks and responsibilities are required of that person. The present invention organizes the project information, such as conditions, particulars, states, identities, assignments, etc. in a manner that focuses responsibilities to particular people without inundating and confusing a particular person with information unnecessary for their task.

As a result, a person may utilize, through such a user interface, the summarized components of the present invention in order to define the project life cycle, roles and responsibilities, determine the unassigned roles, assign and/ or reassign them, and in other ways insure that the project team is sufficiently staffed in order to successfully develop the project work products.

An advantage of maintaining a separate role object is that it allows easy determination of the roles associated with a given project, the currently assigned agents, and the responsibilities of that agent with excellent performance because only the roles associated with the projects(s) and agent(s) selected need be examined. See scenario 1 for details.

Another advantage of maintaining a separate role object is that it further separates the policy from specific persons and/or teams and allows it to be treated more generically, thus increasing the stability of the conditional policy associated with a process. See scenario 2 for details.

An advantage of treating a project like an agent because of its associated list of roles, allows a role to be assigned to an entire team, meaning that any member of a project team that fills a role is able to execute any of its associated authorities, thus, greatly reducing the number of authorities and roles required in the system. See scenario 3 for details.

Treating roles as a kind of projects has the advantage that a role can be reassigned (by authorized persons) to another by simply reassigning the agent, which effectively reassigns all authorities assigned to the role. See scenario 4 for details.

A further advantage of treating roles like projects is that a role can fill a role. For example, the "manager" of one project may need to be a "reviewer" of another related project. See scenario 5 for details.

Yet another advantage of treating roles like projects is that they can have complex lifecycles that govern whether or not they are "filled" by the agent. For example, when an role is first offered or proposed, then accepted or rejected. This has the advantage of increasing the stability of the policy by separating it even further (to that associated with every authority of the role). See scenario 6 for details.

Still yet another advantage of treating roles like projects is that they can have other roles associated with them. For example, a manager role may carry with it an administrative assistant and a staff person to help the manager perform his duties. This also has the advantage of increasing the stability of the policy. See scenario 7 for details.

Finally, another advantage of treating a role as a kind of project is that roles can be defined in terms of another more "generic" role which will make their specification much simpler and far more stable, as well as allow the complex state model and associated roles described above to be reused across many roles. See scenario 8 for details.

An advantage of allowing projects to depend on other projects is that it makes process definition and optimization easier, because the dependencies between work products can be made explicit, thus, the system can automatically enforce sequential behavior when required (i.e., "source" work products must be developed first, then components), and allow parallel activity when no dependency is identified.

An advantage of treating states like projects is that they can then be easily decomposed into associated work products and support a lifecycle geared towards composing them, since they can also take advantage of the ability to be defined by other more generic states, reuse can be further exploited, and the definition process can be taken to any level of detail.

An advantage of treating transitions like projects is that they can also be decomposed if necessary and support a complex lifecycle with intermediate work products, if the policy of the system requires it. This will allow for the system of the invention to support definition of and execution of "long running" transitions as well as exploit reuse even more.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 19 illustrates a graphical user interface showing ownership;

FIGS. 20 and 21 illustrate drop-down menus associated with the user interface illustrated in FIG. 19;

FIG. 39 illustrates a flow diagram of a method to determine roles filled by a user in a given project;

DETAILED DESCRIPTION OF A PREFERRED EMBODIMENT OF THE INVENTION

Figure 1:
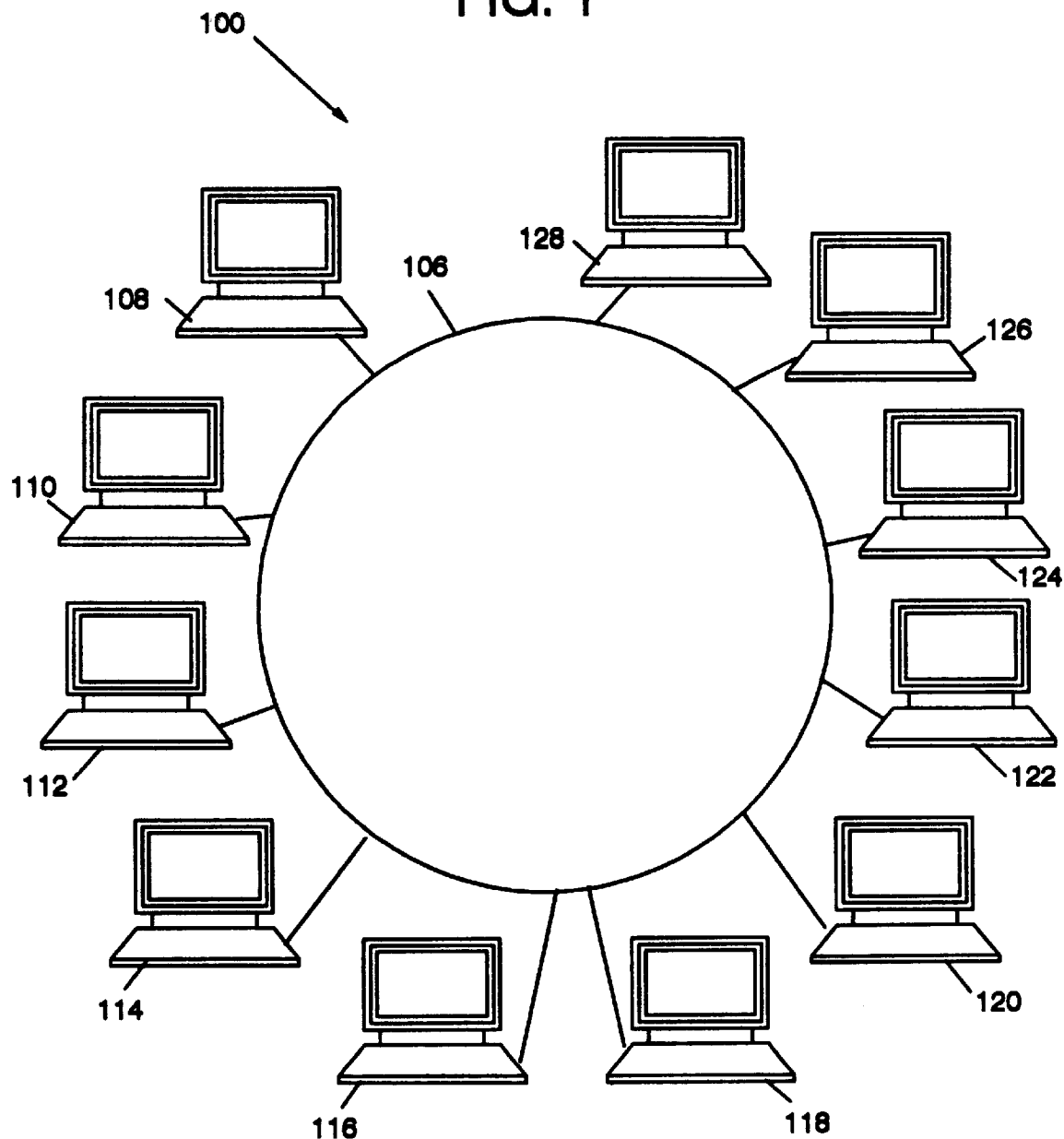
FIG. 1 illustrates a distributed processing system configurable for implementing the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated distributed processing system 100 having data processing systems 108, 110, 112, 114, 116, 118, 120, 122, 124, 126 and 128 connected thereto in a conventional manner. Network 106 may be a local area network, a wide area network, or a nationwide or international data transmission network or the like, such as the Internet.

Figure 2:
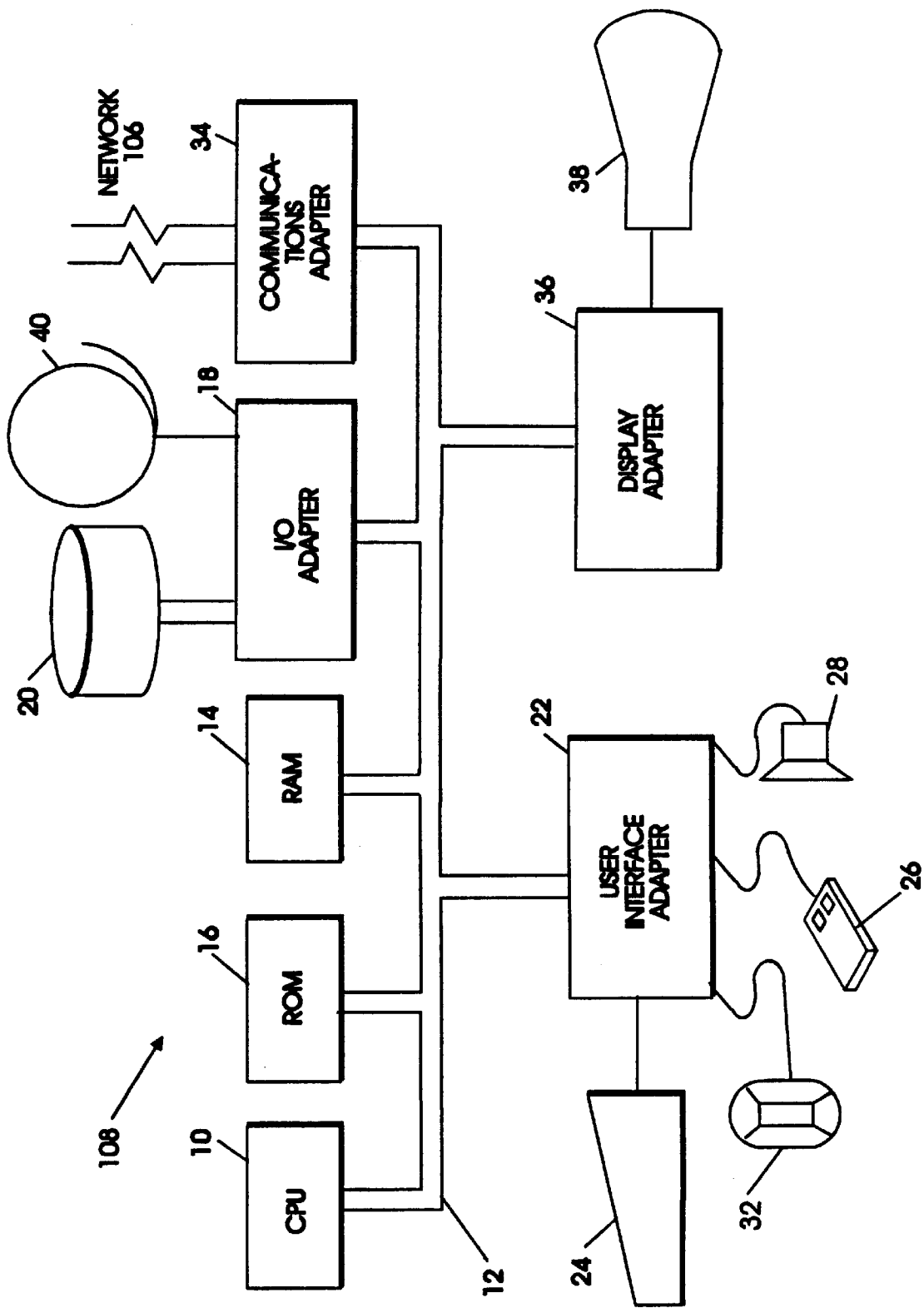
FIG. 2 illustrates a data processing system for implementing the present invention.

Referring next to FIG. 2, there is illustrated a representative hardware environment, which illustrates a typical hardware configuration of data processing system 108 (see FIG. 1) in accordance with the subject invention having a central processing unit 10, such as a conventional microprocessor, and a number of other units interconnected via system bus 12. System 108 shown in FIG. 2 includes random access memory (RAM) 14, read only memory (ROM) 16, I/O adapter 18 for connecting peripheral devices such as disk units 20 and tape drives 40 to bus 12, user interface adapter 22 for connecting keyboard 24, mouse 26, speaker 28, microphone 32, and/or other user interface devices such as a touch screen device (not shown) to bus 12, communications adapter 34 for connecting system 108 to network 106 and display adapter 36 for connecting bus 12 to display device 38.

Figure 3:
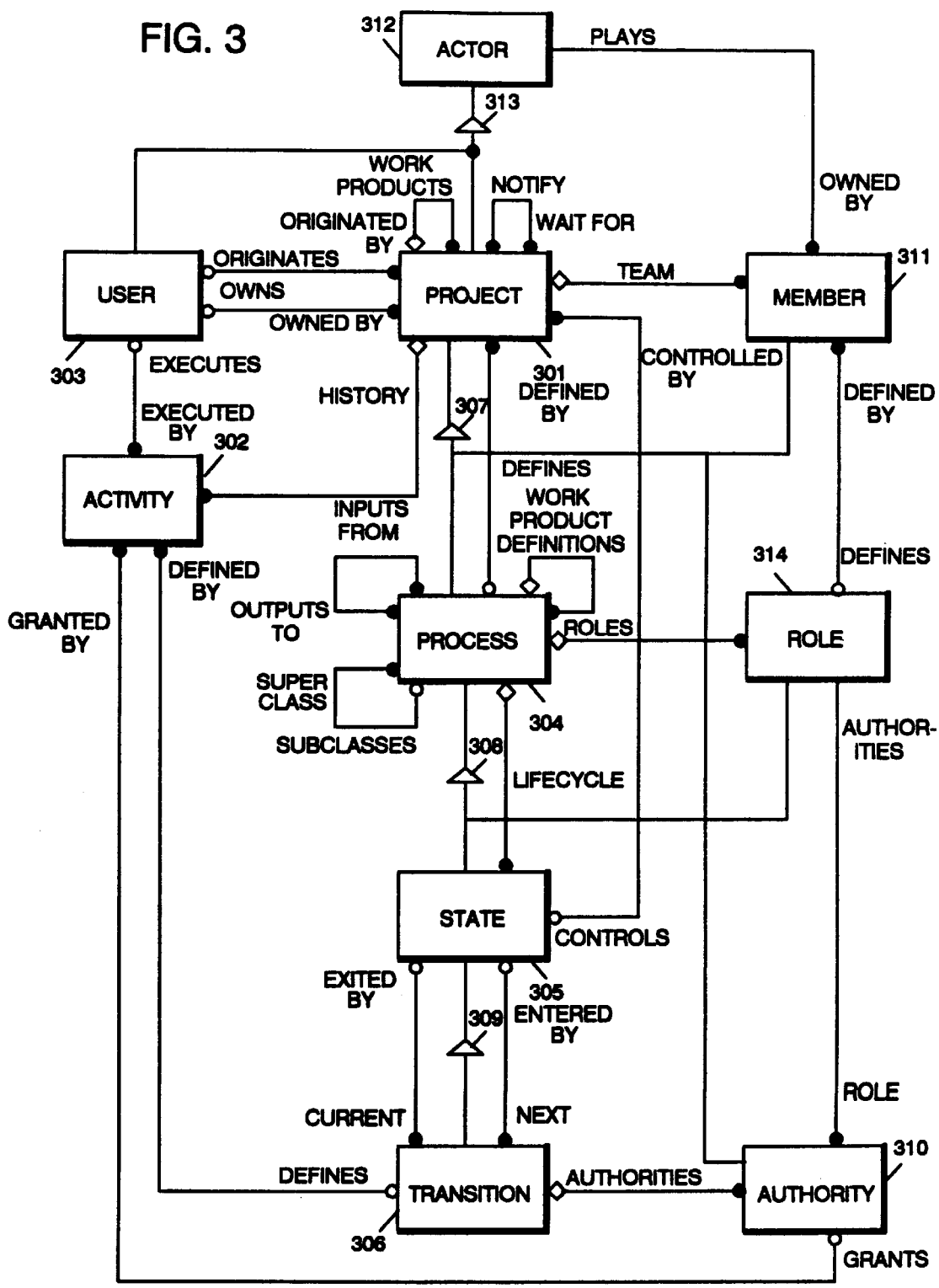
FIG. 3 illustrates a static model of the present invention.

Referring to FIG. 3, there is illustrated a Rumbaugh style depiction of a model of the present invention. Rumbaugh notation is well known in the art; please refer to *Object-Oriented Modeling and Design*, James Rumbaugh, Michael Blaha, William Premerlani, Frederich Eddy, William Lorensen, Prentice Hall© 1991, which is hereby incorporated by reference herein.

Referring now to FIG. 3, there is shown the static diagram of the present invention showing the objects implemented in the system 108 and the relationships. These objects will be stored in the database and used to drive the processing of the system 108 and the various methods that will be discussed as well as the various interfaces described below.

A purpose of this system 108 is to allow users 303 to create projects 301 that may or may not have a defined process 304 that describes a lifecycle of states 305 and transitions 306. The transitions 306 may have authorities 310 that grant access or the ability to initiate activity 302 that drive the project 301 through the lifecycle.

A process 304 has a list of roles 314 wherein authorities 310 are associated with a role 314. Like a process 304 defines a project 301, a role 314 defines a member 311. A member 311 is associated with a project 301 which has a team of members 311. These members 311 are played by an actor 312.

A user 303 is one kind of an actor 312 through an inheritance relationship 313. Similarly, a project 301 inherits 313 from an actor 312. By virtue of the fact that a member 311 is a kind of a project 301 through inheritance 307, this not only enables a member 311 to support a complex lifecycle as does a project 301, but also enables a member 311 to play the part of an actor 312 in the system. The net effect of this is that an actor 312 plays various members 311 in the team of a project 301.

Figure 38:
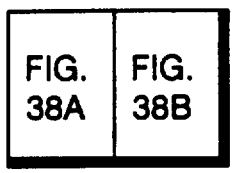
FIG. 38A–38B a flow diagram of a method to determine authority.

And again, a member 311 is defined by a role 314. The benefit of having an authority 310 associated with a role 314 instead of with a user 303 is that it makes it much easier for a user 303 to delegate and/or reassign the various responsibilities associated with that authority 310. By virtue of the fact that a user 303 plays the role 314 of a member 311 in a team of a project 301, means that by reassigning the user 303 that plays the member 311, one effectively reassigns the role 314 and therefore, the authorities 310. Another benefit is that by associating the authorities 310 with the role 314, the conditions associated with said authority 310 are much simpler and more stable in the sense that a given authority 310 need only be associated with a single role 314. As described further with respect to FIG. 38, this will greatly simplify the method used to determine that authority 310 when a "complete" transition 415, 417, 445 from a project 301 in progress 42 is invoked.

A project 301 contains work products that are other projects 301; a project 301 may notify and/or wait for other projects 301 to complete: a project 301 is defined by a process 304 and is controlled by a state 305; a project 301 has a history of activities 302; and, a project 301 is "owned by" and "originated by" a user 303. Furthermore, a project 301 contains a team of members 311 and inherits from actor 312 through the inheritance relationship 313. This inheritance from actor 312 is key to allow a project 301 to play the part of a member of another project's 301 team. The benefit here is the ability then to assign an activity 302 to an entire team 301 of members 311 such that any single member 311 through a user 303 that eventually plays that member 311 can execute the activity 302.

A process 304 has "inputs from" and "outputs to" other processes 304 to show dependencies and can be organized into hierarchies through the superclass/subclass relationship between processes 304 and can describe attributes and/or subwork products through work product definitions, and can contain a lifecycle of states 305. A process 304 is a kind of project 301 through the inheritance relationship 307 which enables a process 304 to undergo a complex lifecycle regarding its development as well providing a highly integrated system that enables this same approach that is taken for projects 301 to be used in developing processes 304.

State 305 can be "exited by" a set of transitions 306 and/or "entered by" a set of transitions 306. A state 305 controls project 301. A transition 306 contains a list of authorities 310 and defines activities 302.

Authority 310 has a single role 314 attached. A role 314 has a list of authorities 310 that it maintains allowing the user 303 of the system to determine the responsibilities and authorities of a given role 314 that they may play as part of a member 311. This allows for a system where the teams associated with the project 301 can be flexibly and easily put together once the project 301 is created. At that point the roles 314 with respect to the defined process 304 of a project 301 are used to create associated member objects 311 which then must be filled prior to the ability of any user 303 to act and provide and initiate activities 302 using the authority 310 granted by the members 311 as will be discussed later. Users 303 are also able to see, by virtue of being a kind of actor 312, the roles 314 or members 311 that they play with respect to various project teams 301.

From the point of view of a process 304, the roles 314 associated with that process 304 can be likewise viewed as well. Again, very similarly a transition 306 can be viewed to determine what authorities 310 are associated with it and therefore understand the roles 314 that are needed in order to complete the lifecycle of the process 304.

Figure 4:
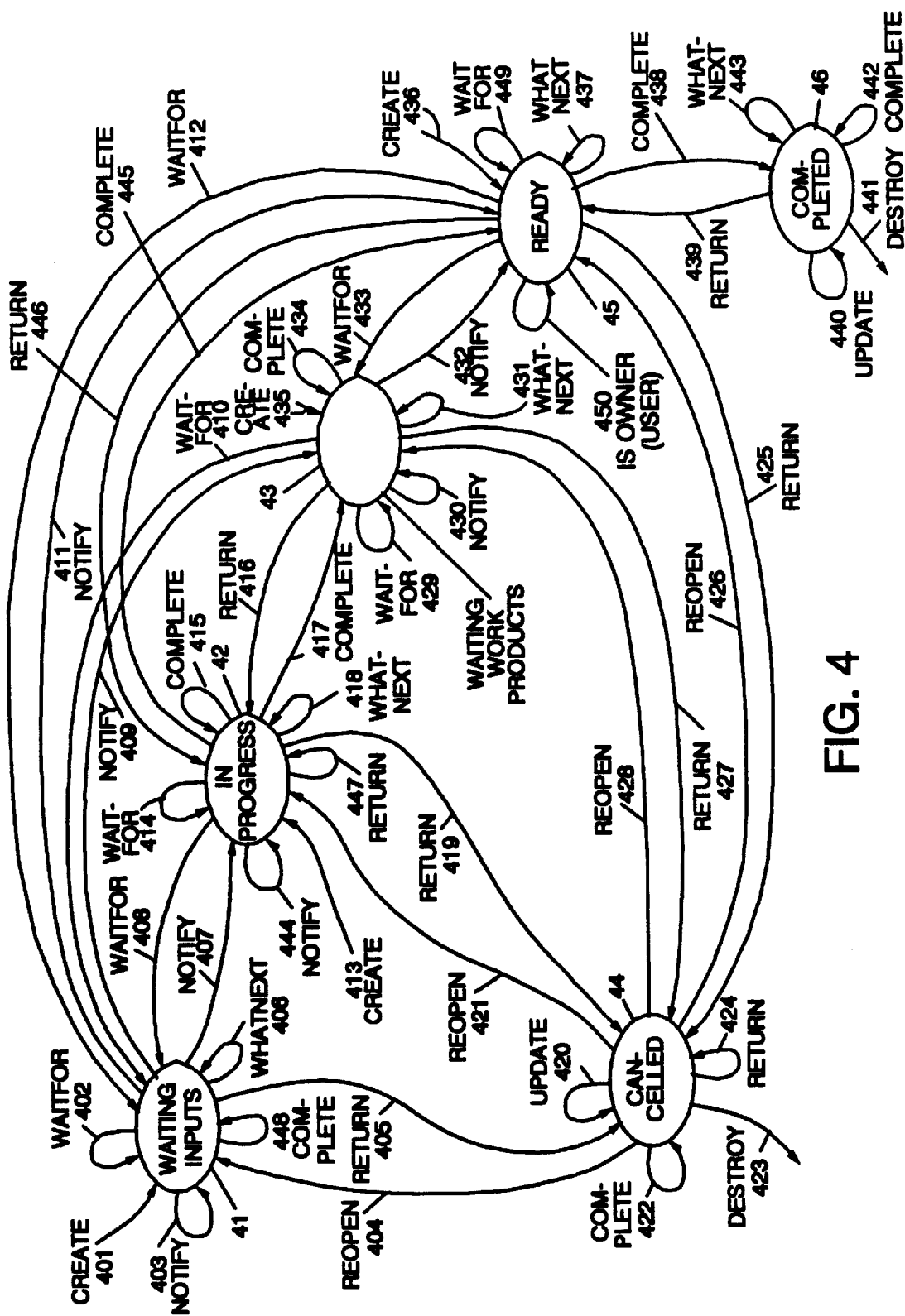
FIG. 4 illustrates a dynamic model of a project.

Referring to FIG. 4 there is illustrated the dynamic model of the project 301. The purpose of the dynamic model is to show control of the behaviors that are associated with the objects shown in FIG. 3. FIG. 4 is associated with instances of project 301 objects as shown in FIG. 3. The behaviors associated with project 301 can be summarized as follows: create transition or method (which causes new projects 301 that come into being); retrieve (which retrieves various attributes of a project 301); update (which will update various attributes associated with the project 301); and destroy (which causes the project 301 to be removed from the system). These methods are primitives associated with just about any object in an object-oriented system and there may be specific overrides to the behaviors associated with these that will be described as part of this description of FIG. 4.

There are some additional behaviors that are not in this primitive set. For instance, the "wait for" transition or method gets invoked in two cases: when an actual project 301 is added to the "wait for" list of a given project 301 and when a new project 301 is added to the work products list of a given project 301. In that case, a "wait for" method is invoked on a given project 301.

The "notify" is the converse of a "wait for". And, whenever a project 301 completes, it sends a "notify" method that gets invoked on the project 301 that contains it if it is a work product and all of those in the "notify" list of the given project 301. The "notify" and the "wait for" are converses of the same relationship. The "notify" and the "wait for" can be thought of as automatically executed transitions or methods, whereas there are two methods that cause explicit motion through the lifecycle of the project 301, i.e., the "complete transition" and the "return transition", which are geared towards taking one forward and backwards in a process.

Further transition is the "whatnext" transition which describes whether or not action can be taken on a given project 301 at a given time. This is useful when building a whatnext view from a user to see what projects 301 that that user 303 owns that are currently waiting on any kind of activity from that user 303.

Given the above set of behaviors that may be invoked on a given project 301 at any given time, the purpose of the dynamic model is to describe the specific behavior of each of those methods depending on a global state of the lifecycle model of the project 301. FIG. 4 shows a default process 304 model that is possible for any given project 301. The key here is that FIG. 4 shows the coordination of an ad hoc default process 304 with an explicitly defined process 304 by the user. This benefit enables one to quickly build up projects 301 and processes 304 from scratch without having predefined processes in place before work begins.

In general, one can consider there to be three major categories of state: automatic, explicit, and inactive. The first automatic state, waiting input 41 indicates that the project 301 has a list of projects 301 in its "wait for" list that must be completed before further activity can take place on the project 301. The semantics of having projects 301 in the "wait for" list require that all projects 301 that are being waiting for are in the completed state before additional work can take place.

The next automatic state is the waiting work product state, and that is given that a project 301 may have work products defined as contained within it. The semantics is that a project 301 cannot complete until all work products are completed. This does not prevent work taking place in parallel on the project 301 while those work products are of themselves being completed. This is one other difference from a dynamic prospective between the "wait for" and "notify" relationship and the work product relationship between projects 301 beyond the containership versus reference perspective. In the waiting work products state 43, once all the work products are completed, then it is considered that further progress on the project 301 is able to take place.

Next, there are the two explicit states. These are states in the dynamic model of a project 301 that the user is expected to explicitly cause state changes through the return or complete transition. One to completes things to the next state, one returns them to the previous state. The in progress state 42 indicates that a project 301 has a complex lifecycle that must be followed before it is ready to complete. Ready state 45 is the next explicit state (again, a complete is required to move it to the next state). In the ready state 45, all projects 301 that are being waited for are completed, all work products are completed, and if there is any complex lifecycle, that complex lifecycle has been completed as well. So at the ready state 45, the project 301 is truly ready to be reviewed and completed by the project 301 team.

Then, there are the two inactive states. When a project 301 is in the ready state 45, the completed state 46 occurs when a project 301 is completed and a complete method is invoked in the ready state 45. Thus, a completed state 46 indicates that a project 301 has been successfully completed. The cancelled state 44 occurs whenever a project 301 has been returned back through the first state in the process 304. That is, any of the states of waiting input 41, in progress 42, at the very first state of a complex lifecycle, or in waiting work products state 43, where no such complex lifecycle exists, then the project 301 has been cancelled. The notion of a cancelled project 301 is one that is never intended to complete the lifecycle.

In summary, waiting inputs state 41 indicates that there are actually projects 301 waiting to complete that this project 301 depends on. In progress state 42 indicates that there are states 305 in the complex lifecycle of the process 304 associated with a project 301 that are waiting to complete. Waiting work products state 43 indicates that there are work products associated with this project 301 that are waiting to complete. Ready state 45 indicates that the project 301 is actually ready to complete, and all work associated with that project 301 is ready. Cancelled state 44 indicates that the project 301 is not intended to be completed. And, completed state 46 indicates that the project 301 has been successfully completed.

A project 301 is created in the waiting input state 41 when there are actually projects 301 on which this particular project 301 is waiting. The "wait for" list is non-null, which will cause the project 301 to be created in this state 41. Once in this state 41, a wait for 402 basically has no effect. The flow control remains in a waiting input state 41. Similarly, the complete transition 448 has no effect and returns flow control back to the waiting input state 41. Again, similarly, the whatnext transition 406, which shows whether or not this project 301 is waiting on any kind of action from the owner, would return an empty list showing that there is nothing to be done on this particular project 301 at this point in time.

Since the waiting input state 41 is one of the automatic states, the notify transition 403 is the one that moves flow of control in the process 304 automatically. The "notify" transitions in general are activated or initiated by the projects 301 upon which a particular project 301 depends. This is either one in the "wait for" list of the project 301 or one in the "work products" list of the project 301. The "notify" has potentially two different effects depending on the size of the "wait for" list. The notify transition 403 causes flow of control back to the waiting input state 41 if after removing the project 301 that is notifying this particular project 301 from the list and that list is not yet empty, then it remains in the waiting input state 41. This is a more or less precise way of saying that if there are still other projects 301 upon which this project 301 is waiting, then the notify transition 403 merely removes the one from the list by indicating that it is completed. However, notify transition 411 occurs if the list that would result form removing the notifying project 301 is empty. In other words, if no other projects 301 are being waited on, then the notify transition 411 may occur. The next state in this case is relatively complex. It can either go to the in progress state 42, the waiting work product state 43 or the ready state 45. As discussed before, notify 407 takes to the in progress state 42 if there is a complex lifecycle, notify 409 takes to the waiting work product state 43 if there is no complex lifecycle or if the complex lifecycle is completed already and there are work products associated with the project 301 that have not yet completed. Notify 411 takes the flow of control from waiting input 41 to the ready state 45 if, and only if, there are no states in the lifecycle that are not completed or there are no work products that are not completed. In other words, if everything is ready after the inputs that it is waiting on are completed, then it goes straight to the ready state (transition 411).

A project 301 is created in the in progress state 42 when there are no inputs that it is waiting on. They are either all complete or there are none in that list. In that case, and there is a complex lifecycle to be executed. In this case, the project 301 is created in some state of the lifecycle that will be discussed later. This transition is create 413. The create transition 413 will create the project 301 in the in progress state 42. The in progress state 42 is an explicit state, meaning that a return or a complete transition is necessary to move it along in the lifecycle. In this case, the notify transitions usually have no effect, so the notify transition 444 tends to just transfer the flow of control right back to the state 42 with no effect. The wait for transition 414 may have an effect if a new project 301 is associated with this project 301 that it should be waiting on. If that "wait for" happens to be a work product, there is no reason to cause the flow of control to return to the waiting input state 41. So transition 414 associated with a "wait for" will cause flow of control straight back to the current state in progress whereas "wait for" will cause transition 408 back to the waiting input state 41 if a true dependency is added to the project 301 while it is in progress. In this case, the waiting takes it back to waiting inputs 41.

The behavior associated with a "return" transition depends on the actual lifecycle. If at the first state of a lifecycle, then the "return" transition acts as that described in the return transition 419 and moves the project 301 back to the cancelled state 44. That is, if at the beginning of the project 301 it is returned, then it is returned to the originator. If it is not at the first state 305 in the lifecycle, then the return transition 447 leaves control in the in progress state 42 at a high level, yet the "controlled by" link gets reset to the previous state 305 in the lifecycle. This is determined through the history. It is in essence like backing through the activity 302 and determining what states 305 have been executed or passed through in causing the flow of control back to that state 305. A "return" transition has particular undo actions associated with it that are executed in either return transition 447 or return transition 419 that causes any actions to be undone prior to any flow of control that may occur.

The "complete" transition is very similar, from a forward direction perspective. There are potentially three other states that a "complete" transition may flow to as well, depending on the state 305 of the project 301. That is, if a project 301 is in the middle of a complex lifecycle, the complete transition 415 merely causes the flow of control to stay in the in progress state 42. However, the detailed state is indicated by changing the "controlled by" reference associated with the project 301 to the next state 305 associated when that particular transition 306 is executed. If there happens to be many transitions 306 from a state 305, then a "complete" transition will provide a list that shows the set of transitions that could be invoked and then the user is expected to select one, which is then executed.

When at the last state 305 of the complex lifecycle, and there is a transition 305 that has no next state 305 associated with it, then the flow of control goes to one of two states. It flows into the waiting work product state 43 via complete 417 when there are work products that are not yet completed. If all work products are completed, then flow of control flows directly into the ready state 45 via the complete transition 445. In any case, whether from complete 415, complete 417, or complete 445, the transition has a guard associated with it to determine whether or not the conditions necessary to permit action can take place. So, it is possible that the "complete" transaction may fail due to the guard not passing.

The whatnext transition 418 for a team returns a list with this particular project 301 in it. This indicates that there is work to be done on this project 30.

The create transition 435 causes flow of control to start in the waiting work product state 43 when there are no projects 301 on which this one is waiting, there is no complex lifecycle that is not complete, but that there are work products that this particular project 301 contains that are not yet complete. So, in that case, the project 301 will start out in the waiting work products state 43 via transition 435. Given that this waiting work product state 43 is an automatic state, it is the action of the "wait for" and "notify" that have the most effect. The complete transition 434 in a sense has no effect because the user is not allowed to directly complete this project 301. It will move to the ready state 45 automatically through the notify actions. Notifies, at this point, occur when each work product associated with that project 301 transitions to the completed state 46 and they will cause the notify transition either 430 or 432 to be invoked. Notify 430 gets invoked when there are other work products remaining to be completed. Notify 432 gets invoked when there are no more work products left to be completed. In the case of notify 432, the transition or the flow of control is to the ready state 45. The return action, unlike the complete action having no effect, will cause flow of control either to the in progress state 42 via transition 416 or to the cancelled state 44 via transition 427. The return transition 416 is taken when there is a complex lifecycle that was completed prior to entering the waiting work product state 43. The waiting work product returns 427 to the cancelled state 44 when there is no such lifecycle associated with the project 301. Wait for transition 410 potentially has two effects as well. If a new project 301 is added to a work product associated with that project 301, then the wait for via 429 merely transfers flow of control back to the waiting work products 43. That is indicative of there merely being one more work product to wait on. However, if that project 301 is not added as a work product associated with the project 301, but is instead added to the actual wait for list (i.e., it is one of the inputs of the project 301), then flow of control transfers back to the waiting input state 41 if that project 301 is not yet completed.

The "notify" has similarly two effects as well (or two flows that may occur). Notify 430 indicates that a particular work product associated with the project 301 completed, but it is not the last work product that needs to be completed. The notify 432 occurs when the last work product associated with a project 301 has been completed and this transition 432 causes flow of control to the ready state 45.

In the waiting work products state 44, there is no explicit action that can be taken by the owner of this particular project 301 except to look at the work products that are being waited on. So in this case, a "what next" returns an empty list.

Projects 301 are created in the ready state 45 if and only if there are no projects 301 on which it is waiting, no work products that are not yet completed, and no lifecycles that are not yet completed either. So the net effect is some projects 301 may just be a place holder or reminder, and therefore they will get created directly in the ready state 45. So the create transition 436 causes flow of control directly into the ready state 45.

The whatnext transition 437 associated with the ready state 45 is relatively simple, and again, it being an explicit state returns a list with this particular project 301 in it to indicate that the owner is responsible for actually completing this particular project 301.

Figure 40:
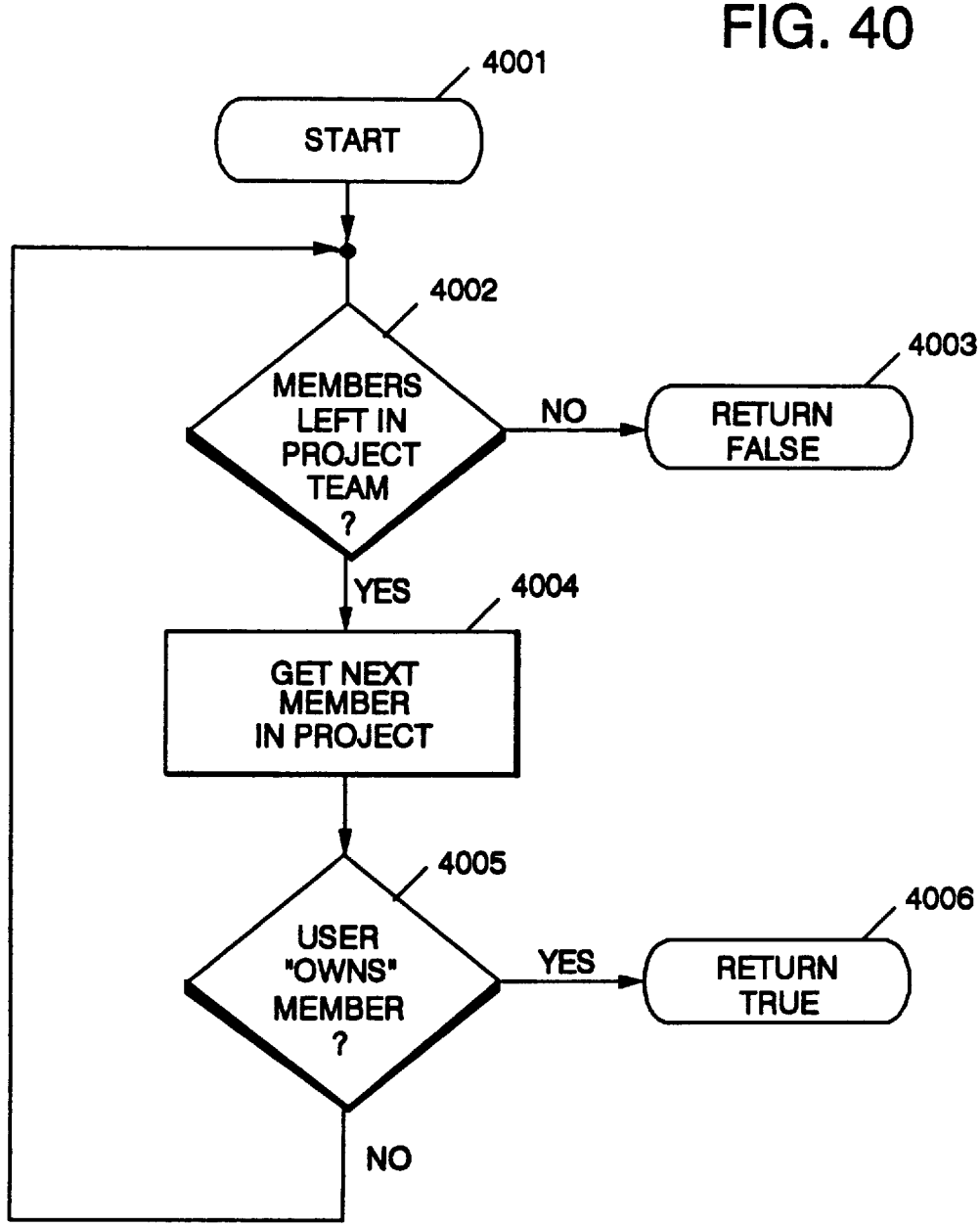
FIG. 40 illustrates a flow diagram of a method to determine if a project is "owned by" a given user.

In the ready state 45, a project 301 can respond to the "is owner" method 450, the logic of which is discussed in FIG. 40. In all other states of the dynamic model of a project as shown in FIG. 4, the "is owner" method would return false.

Given that there are the "wait for" and the "notify" behaviors that could occur from an automatic basis, those are now discussed. The "wait for" transition occurs again when either a new project 301 is added as a dependency, i.e., an input, or a work product. The type of dependency added and the projects 301 state will cause particular flow of control. If either type is added, that is already completed, then the wait for 449 executes causing flow of control back to the ready state 45 and there is no change in the state of the project 301. If one is added that is not complete that is a true input dependency via the "wait for" list associated with a project 301, then the wait for transition 412 is invoked which causes a flow of control back to the waiting inputs state 41. Finally, in the case where a work product is added that is not complete, then wait for transition 433 is invoked, which causes flow of control to the waiting work product state 43.

Complete transition 438 has one purpose in the ready state 45 and that is to cause flow of control from ready 45 to completed. This is the minimal amount of work that has to be done by the user and there is always an explicit action. That is, whenever a project 301 is created, it must be completed (46) or cancelled (44). The cancel action occurs by doing a "return". If return transition 425 is executed, that can cause a flow of control to the cancelled state 44. However, return 425 goes to cancelled 44 if and only if there is no explicitly defined lifecycle state that has been entered. If there is a complex lifecycle that was executed, then the flow of control returns to the last state in that lifecycle that was entered. That will move the state or the flow of control back to in progress 42 via transition 446. Completed 46 is one of the inactive states where the "whatnext" transition 443 merely returns an empty list.

The complete transition 442 is ignored and causes no effect because this project 301 has already been completed. A "notify" and a "wait for" have no effect with respect to state 46. This is shown a little bit more explicitly with transition update 440. This transition 440 is included here to show that no updates are permitted in the completed state 46. One cannot add "wait for" or other work products to a project 301 once it is in the completed state 46. If that is the case, then one must execute return transition 439 to move the flow of control back to the ready state 45. This is a way that one can then update and add new "wait for" projects 301 or new work products that will cause the flow of control as discussed above in the ready state 45.

Once a project 301 is created, it cannot be destroyed until it reaches one of the inactive states. Destroy transition 441 can only occur when a project 301 has no dependencies that are waiting on it. However, it is possible to delete a work product of another project if it has no output dependencies as stated above.

Cancelled state 44 is very much like the completed state 46 in that it is an inactive state 45. However, just like a completed project 46 can be returned back to the ready state where further action can take place, a cancelled project 44 can be reopened. The complete, update and the return actions are ignored as shown with update transition 420, return transition 424 and complete transition 422. These are shown to prevent any of those actions from taking place during this particular cancelled state 44 of the project 301. There are only three real actions that can occur to a project 301 during a cancelled state 44. It can be "retrieved," which is not explicitly shown in any of these states, and also it can be "reopened" or "destroyed". The "destroy" is very much like the destroy transition 423 in that it causes all contained work products to be destroyed and also causes that project 301 to be removed from the "wait for" list of all projects 301 in the notify list of this project 301.

There are four types of "reopen" to move the project 301 back to one of the active states. A "reopen" when there are inputs still waiting to be completed in the "wait for" list causes reopen transition 404 to be invoked causing flow of control to the waiting inputs state. If there is a complex lifecycle, then the reopen 421 causes the project 301 to be "reopened" into the in progress state 42. If there is no lifecycle or the lifecycle is completed and the project 301 is reopened via 428, the flow of control will go to the waiting work product state 43 if and only if there are work products waiting to be completed. And finally, a reopen transition 426 occurs when all basic work is completed on the project 301 and it is ready to be completed in the completed state 46, then reopen 426 causes flow of control from the cancelled state 44 to the ready state 45.

Figure 5:
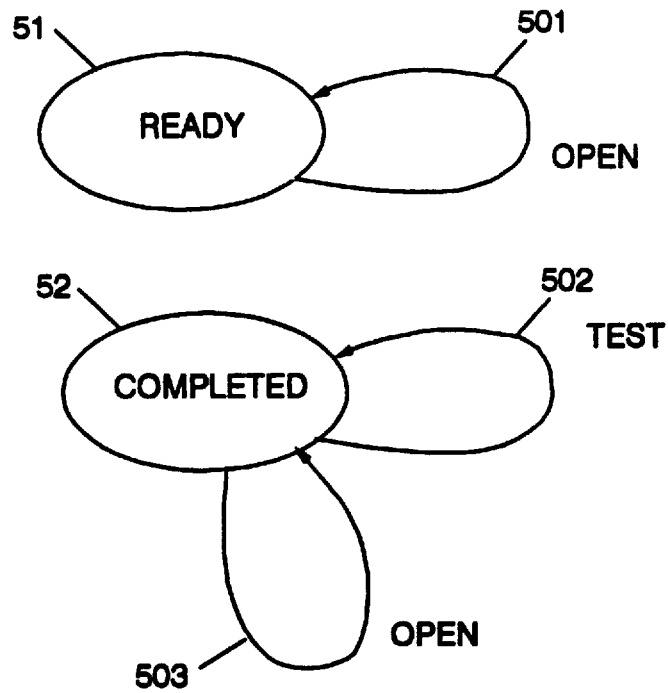
FIG. 5 illustrates a dynamic model of a process.

Referring next to FIG. 5, because a process 304 inherits from a project 301, the dynamic model is basically the same as in FIG. 4. FIG. 5 illustrates merely the overrides to the basic lifecycle which was relatively complex in FIG. 4. The key is that it is still just as complex. It just adds a little extra behavior. In the ready state, shown in FIG. 4 as 45, and shown in FIG. 5 as 51, there is an additional transition open 501 which is used to, in a sense, cause a new project 301 to be created with the given process 304 model. In other words, a project 301 is created that is defined by this particular project 301. The net effect of that is to cause the lifecycle model of the process 304 to be examined for transitions 306 that have no current state 305 associated with them as discussed in transition 306. If there is more than one, then a list is presented to the user for selection. If there is only one, then that one is automatically taken and the object would be controlled by that particular state. In the ready state 51, this open 501 is really more like a test. Only when the process 304 is completed is it considered to be in the production mode where the open 501 causes real activities to take place. One attribute to be discussed associated with each project 301 shown in FIG. 3 is a test attribute. That indicates that this project 301 is only a test project 301 for purposes of determining whether a process 304 is completed and ready for production use or not.

Refer next to the completed state which again corresponds to FIG. 4 as 46, and shown in FIG. 5 as 52, there is shown two transitions, the open transition 503 and the test transition 502. The open transition 503 is exactly as was discussed in open 501 except that the test attribute is set to default. In other words, it is considered to be a production level project 301 at this point. This might help explain why the test transition 52 is added to enable a project 301 to become created in the test mode even while the process 304 is in the completed state. Once it is completed, no updates are allowed to take place, except only during the ready state 51. At the point of ready 51, it is ready to be tested, and at the point of completion 52, when it is in the completed state 52, it is able to actually be used to create real projects 301 and optionally to test projects 301 as well.

Figure 6:
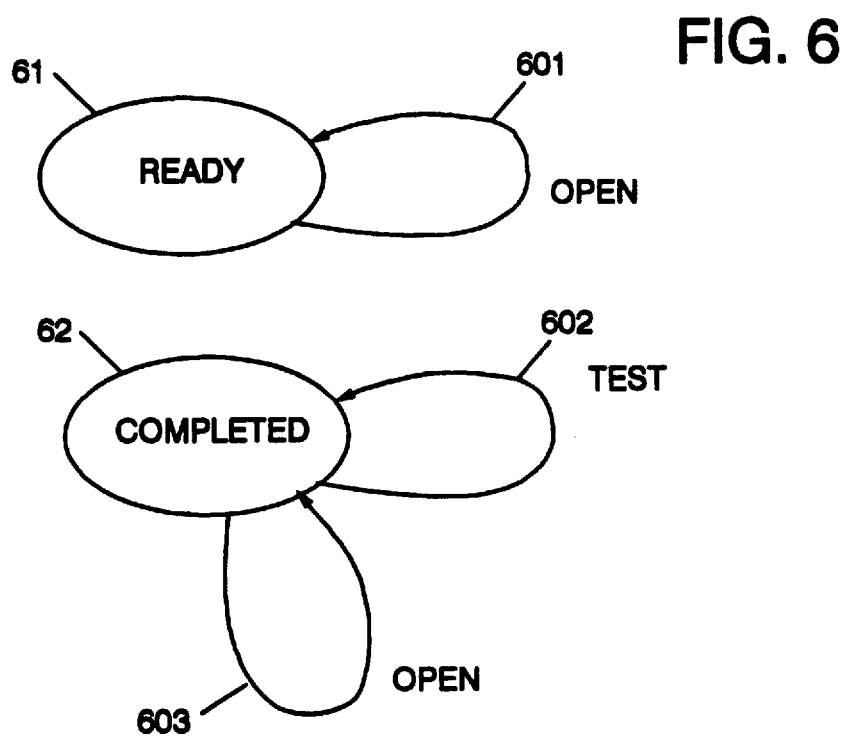
FIG. 6 illustrates a dynamic model of a transition.

Referring now to FIG. 6, there is shown a dynamic model of a transition. The transition 306 is a kind of a state 305 and therefore it is a kind of a process 304 and therefore a kind of a project 301 which means that it inherits the model associated with a project 301 as well as from a process 304. Therefore, it is important to override certain states and transitions. The same two states ready 61 and completed 62 are overridden as similarly done in FIG. 5. The open transition 601 causes an activity 302 to be created that is attached or associated with a particular transition 306. Now the difference here is that the open transition 601 is not executed directly by any user 303. Instead, the open transition 601 is executed during the complete transition of a normal project's dynamic model, particularly transitions 415 and 417, which cause the activities 302 to be created that use that particular transition and therefore indicated in the history. The test transition 602 shown on the completed state 62 is able to be executed by the end-user. Its purpose is to execute any activities 302 associated with the transition 306 itself and does not cause any actual activity log record to be created with respect to the history of a project 301.

Figure 7:
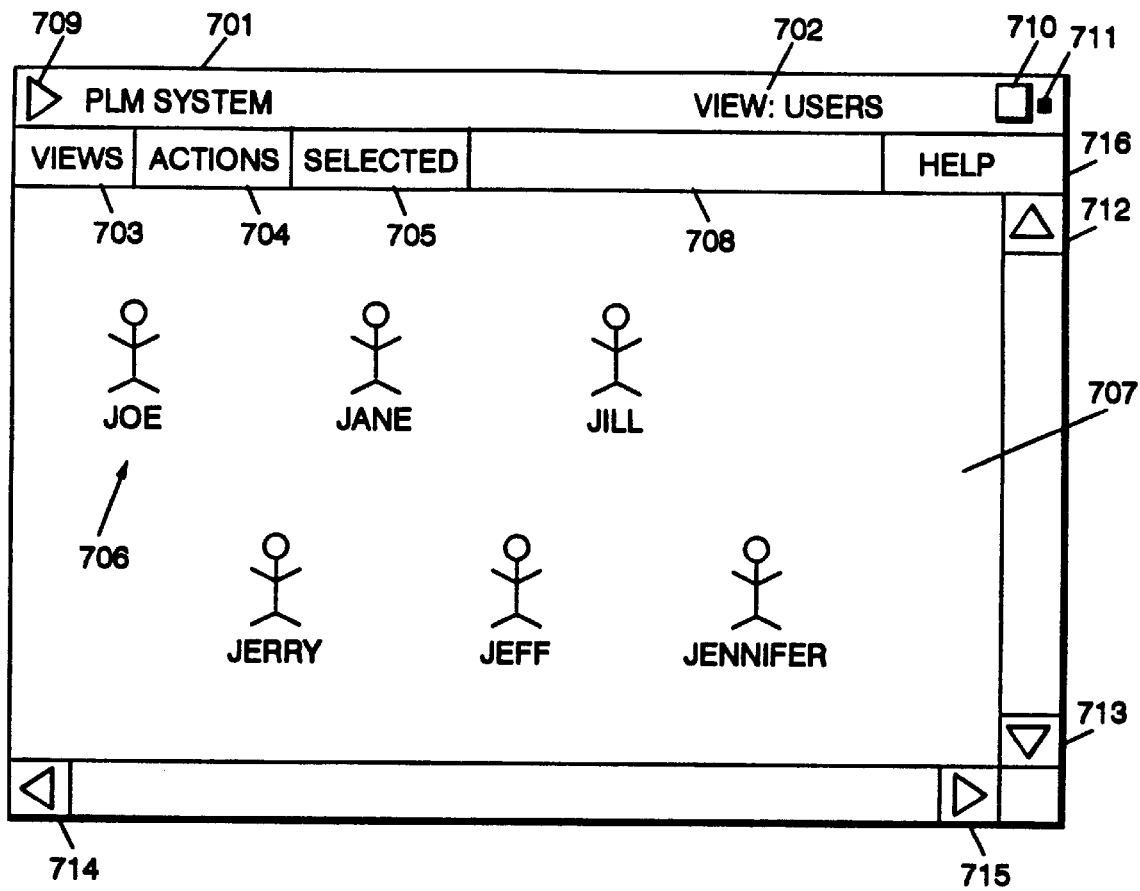
FIG. 7 illustrates a graphical user interface representation of a system user's view showing all users associated with a particular system.

FIG. 7 illustrates a graphical user interface ("GUI") representation of a system user's view, which displays all users associated with the system. Example: The system would display a window 701 that has various components to it, for example a title bar area 702 with icons that allow automatic close 709 of the window 701, maximize 710 of the window 701 and minimize or iconify 711 the window 701. Also, the window 701 would have scroll bar areas 712 that would allow scrolling up and down 713 and also if necessary, left 714 and right 715. The window 701 also has a menu bar area 708 which may enclose functions available while inside of this window 701 that include, in this particular instance, menus associated with views 703, actions 704 and selected 705. Most every window 701 has a help button 716 which would provide contact sensitive help 701, that is specific to the particular window 701 and/or object selected inside of that window 701. Also, in most windows 701, there is some major display area 707, which is called the field. This field 707 may have icons arrayed upon it. In this particular example, there is an icon 706 representing the user Joe.

Actions can be invoked in two different ways. One is by pulling down the menu bar items and selecting a function therein. But also the icons such as Joe 706 can be directly manipulated with a selection device such as a mouse. In general, there can exist four actions that one can do to an icon 706 associated with the display area 707. The first would be to move the icon 706 on the display area 707. This could be invoked via a hold-type action like holding down the right mouse button. A menu can also be associated with the icon 706. In this case, it could be invoked with holding down the left button and then one of the items on the menu selected. The third function that could be invoked directly via the icon 706 is that it could be selected for use in, for example, the selected button associated with the menu bar 708. This could be achieved through a click of the left button. And then finally a default action could be invoked against the object in the case of the user. Maybe it would be to open up the objects it owns or make that user configurable. In this case, it might be achieved through a double click of either button after positioning the cursor of the icon 706.

In the case of FIG. 7, Joe 706 represents a particular user in the system and the default action would be to open the projects "owned by" with the user to be displayed. However, it could just as easily be some other view as shown in the views pull down of FIG. 8 or it could be user configurable.

Figure 8:
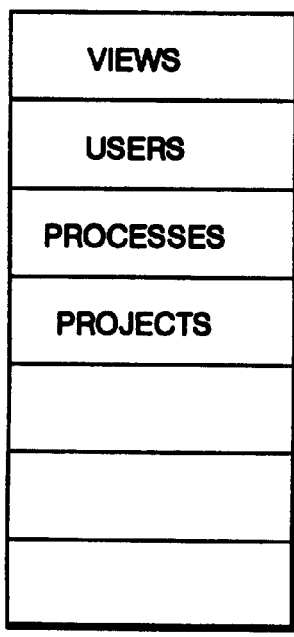
FIGS. 8, 9 and 10 illustrate drop-down menus associated with the user interface illustrated in FIG. 7.

The views associated with the system in general are shown in FIG. 8 when one selects the views pull-down menu 703. The button 801 for views may be attached at menu item 703 to the window 701 shown in FIG. 7 or also in FIG. 11. The main idea is that there are three potential views associated with this system. Buton 802 presents a view of all the users associated with the system processes. Button 803 displays a view of all the top level processes where top level indicates that this process 304 is not contained inside of any other process 304. The projects button 804 where projects 301 that have no defined process 304 are associated, therefore allowing for ad hoc processes associated with the project 301. If an object is contained, it will appear inside the view of the particular object selected (see FIG. 11).

Figure 9:
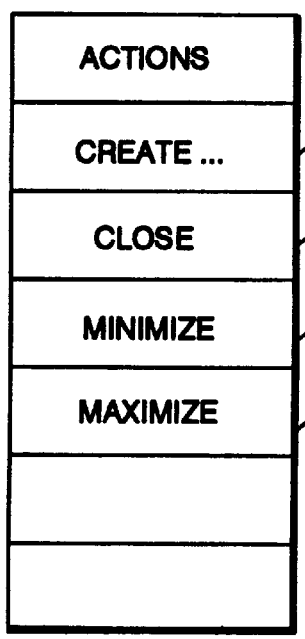

FIG. 9 shows the actions 704 pull-down associated with the users view of the system. The idea here is to provide actions that can occur regardless of what is selected on the screen. For example, create 901, would cause a new user to be created and associated with the system, and close 902 would cause the window 701 to be closed. Minimize 903 and maximize 904 are also shown.

Figure 10:
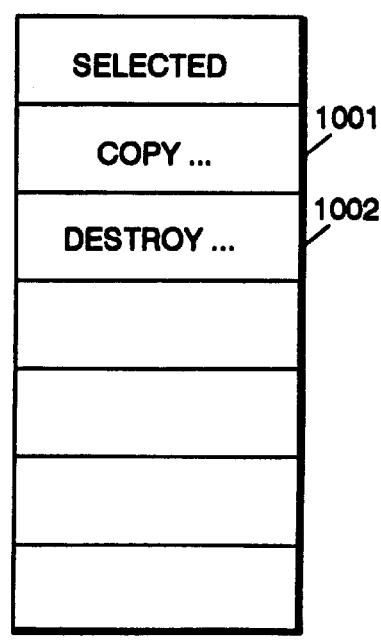

FIG. 10 shows the selected 705 menu bar pull-down with copy 1001 and destroy 1002. Again, these are actions that make sense to do on every object in the field 707 that could be selected. In the case of FIG. 10, if no objects are selected, it would be expected that the menu bar items are "grayed out" which is a visual indication that the action is not selectable at this point in time.

Returning to FIG. 8, if a view is already opened, then it is expected that the view is not recreated, but is rather just brought to the top, or if it is maximized or minimized it would be brought back to normal size.

So given the window 701 shown in FIG. 7 and the pull-downs shown in FIGS. 8, 9 and 10, assume that the views menu pull-down 703 is invoked which would display users 802, processes 803 and projects 804 and that processes 803 was selected as an action. This would cause the system to determine what the top level processes 304 are in the system as described before and display a window 701 such as will be described with respect to FIG. 11.

Figure 11:
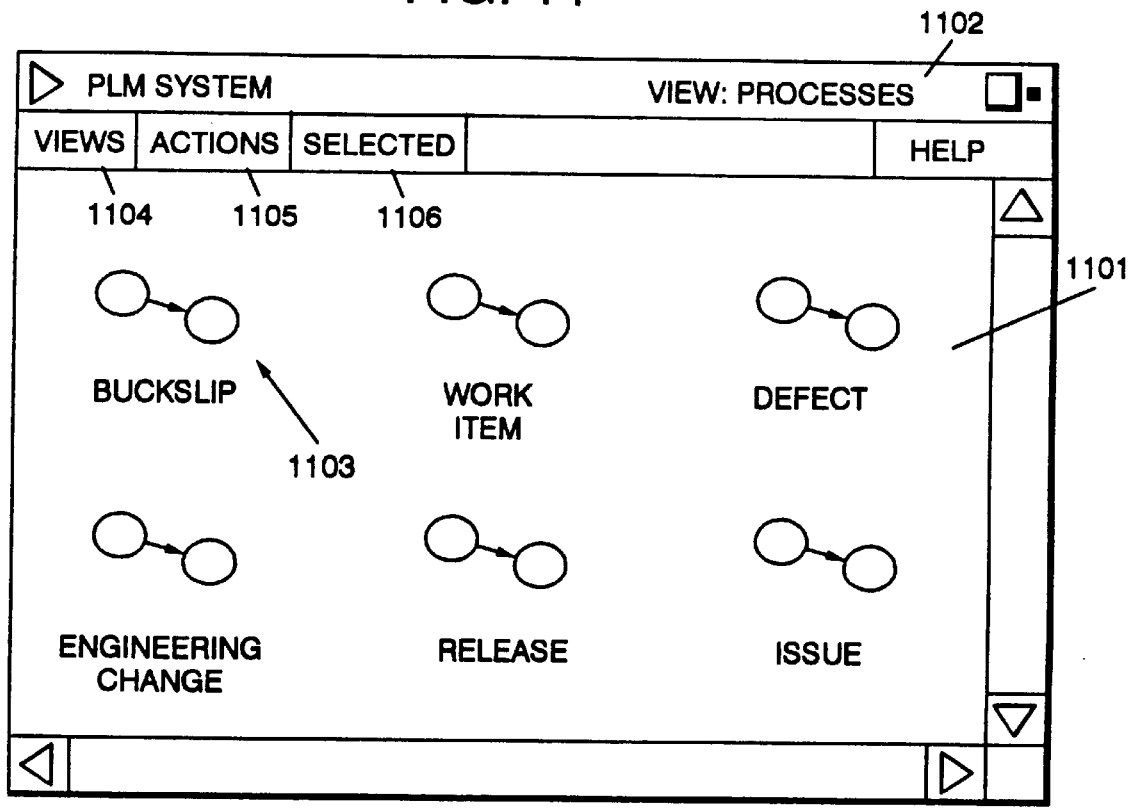
FIG. 11 illustrates a graphical user interface showing processes implemented within the present invention.
Figure 12:
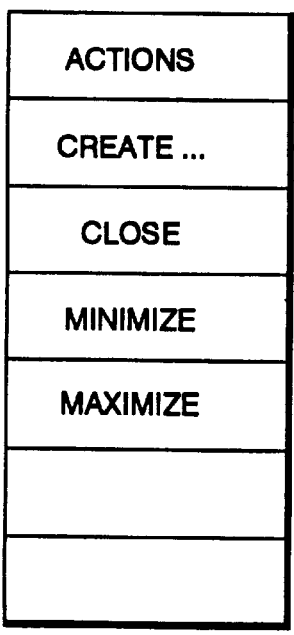
FIGS. 12, 13 and 14 illustrate drop-down menus associated with the user interface illustrated in FIG. 11.

With FIG. 11, the same basic processing as described with FIG. 7 is used. The main difference would be that the view shown in the title bar 1102 would show processes. Also, the views menu bar button would be exactly the same as shown in FIG. 8. The field of the window 1101 would show icon representations of the various top level processes 304 described in the system. Examples: "buckslip", "engineering change". Buckslip 1103 will be used later to describe what happens when a user selects a given icon as described in the direct manipulation portion as discussed above. The actions pull-down menu shown in FIG. 12 is similar as that shown in FIG. 9 except that the create 1201 processing is different at this level in that it could cause the creation of a new process 304 associated with the system at the top level.

Figure 13:
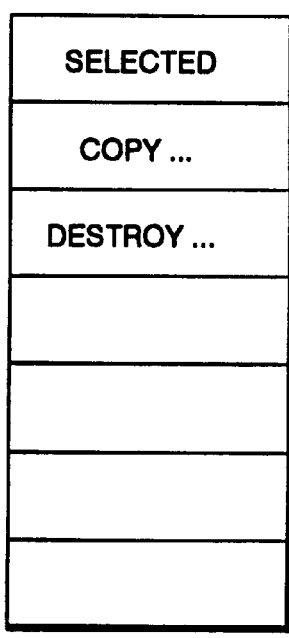

FIG. 13, illustrates a menu pull-down similar to that in FIG. 10. The copy 1301 would cause a process 304 to be copied, a destroy 1302 would cause one to be destroyed.

Figure 14:
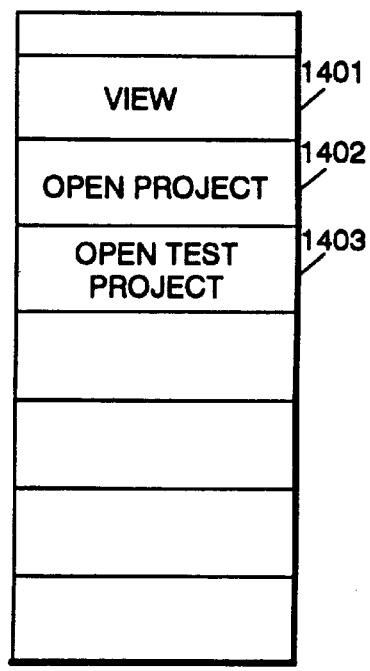

FIG. 14 shows the behaviors that would make sense to do with respect to pulling down a menu on a given process 304.

One would be to view it 1401, which could be the default action, second would be to open 1402 a new project 301 associated with that process, and third would be to open a test project 1403. This function would be only selectable when the process 304 is in the completed state 52 and would correspond directly with the test transition 502 shown in FIG. 5, the dynamic model of the process 304.

Figure 15:
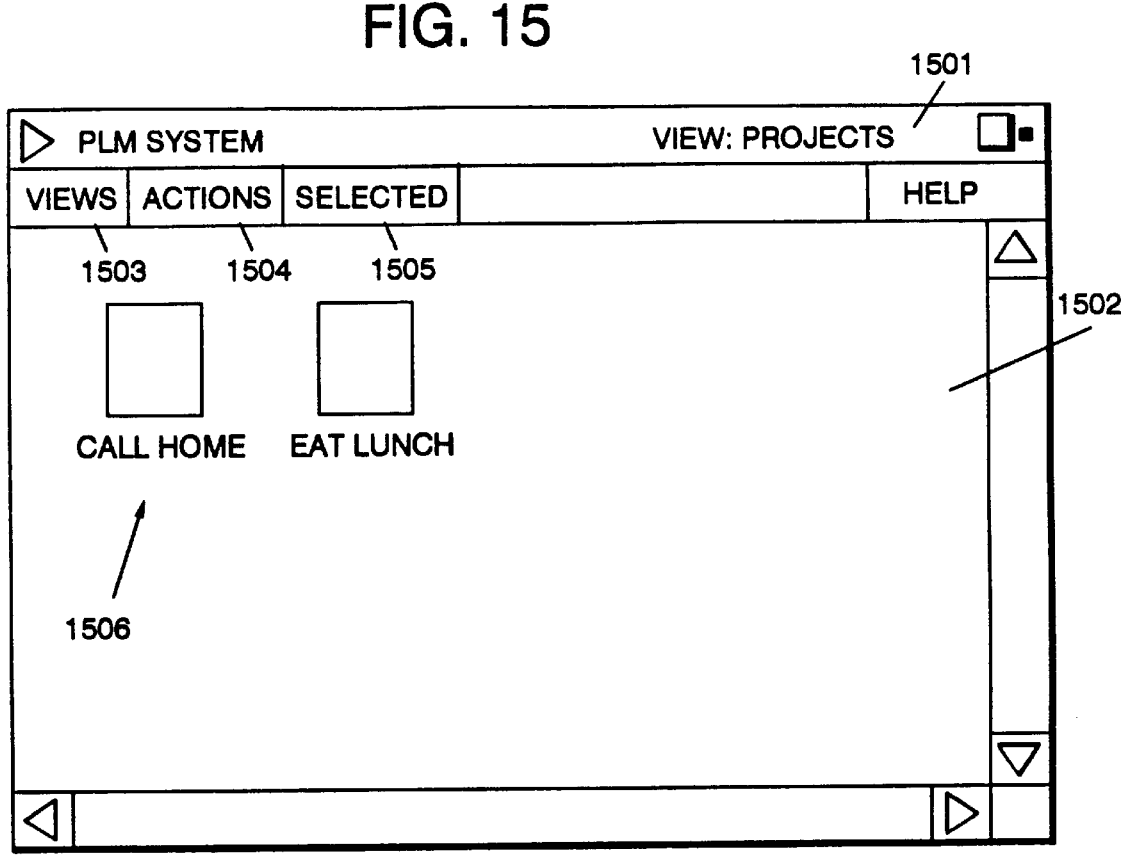
FIG. 15 illustrates a graphical user interface showing projects.

Assuming that the views pull-down is selected as shown in FIG. 8 and the projects 301 button or item is selected as shown in 804, this could cause a window, as is described with respect to FIG. 15, to be displayed in the system work space. In this particular case, the window has a title bar area that shows projects from a system level 1501. The field 1502 shows a list of icons that represent projects 301 in this case or ad hoc projects 301 that have no real defined process 304. For example, call home 1506 and eat lunch, show two ad hoc-type icons that represent projects 301 as it were in the system. The menu pull-downs views 1503 again uses similar processing and logic as described in FIG. 8. Also, the actions 1504 is similar except that it will use FIG. 16. Selecting 1505 will cause the pull-down shown in FIG. 17 to be displayed to the user. If the menu button is selected on a mouse associated with an icon such as call home 1506, then the pull-down associated with FIG. 18 will be displayed.

Figure 16:
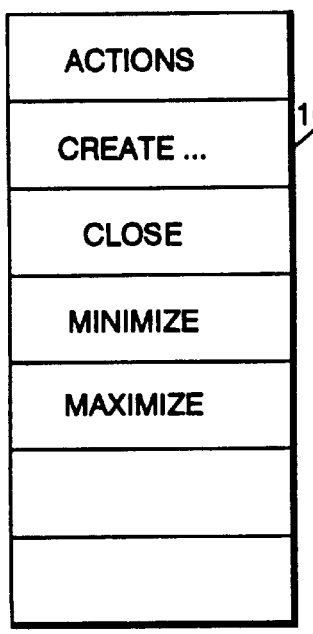
FIGS. 16, 17 and 18 illustrates drop-down menus associated with the user interface illustrated in FIG. 15.

Turning attention to FIG. 16, the basic actions are very similar to those shown in FIG. 12 and FIG. 9. The main difference is that the create action 1601 is geared towards creating a project 301 that is without a defined by process 304. Here the user is free to create a project 301 and associate it with other projects 301 without using the "wait for" list.

Figure 17:
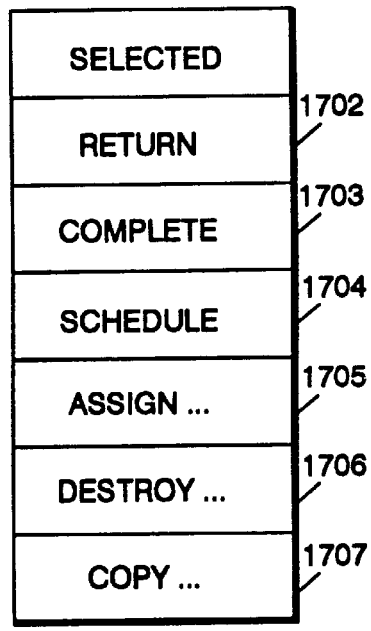

FIG. 17 shows the actions available when items are selected 1505. If none are selected, then it would make sense to have all the items "grayed out", meaning they are unselectable. Shown are the return action 1702, complete 1703, schedule 1704, assign 1705, destroy 1706, and copy 1707. These are actions that make sense to take on any given set of projects 301 that are selected. Further, these actions are shown more or less directly in the dynamic model shown in FIG. 4. The actions that are not shown are the schedule and assign which are basic update functions.

Figure 18:
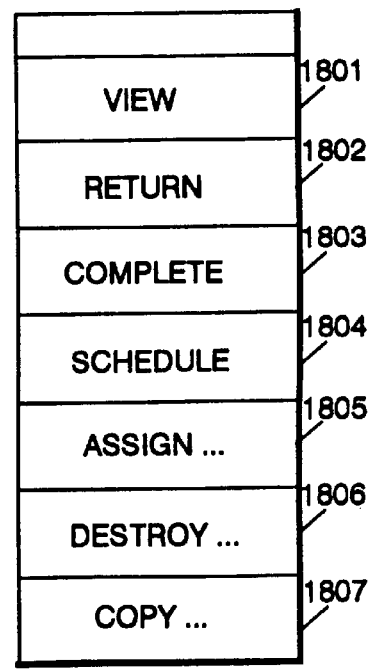

Turning to FIG. 18 there is shown the menu that would be pulled down if the menu direct manipulation selection is selected for given icons, such as call home 1506: action view 1801, return 1802, complete 1803, schedule 1804, assign 1805, destroy 1806, and copy 1807, which are more or less direct analogs to those shown in FIG. 17 except for the view where it makes sense with a single project 301 selected to just select and open that particular one. When there are many objects selected, it does not make sense to open up a whole bunch of views. The processing associated with the return 1802 through the destroy 1806, etc., is governed by the dynamic model shown in FIG. 4.

Assuming for a moment that the user's view is reselected from any of the screens shown in FIG. 11 or 15 or from the main system window, and user Joe is selected, it is possible that the owns list is the default view associated with a given user. In this case, another window that would appear would be a user specific window as shown in FIG. 19. In this case, title bar 1901 shows user Joe and the view owns as the default view. The field 1902 shows those icons associated with projects 301 that user Joe actually owns, one example being buckslip club memo 1903. The menu bar items again look very similar to those described in all the other windows with views 1904 being further detailed in FIG. 20. The "actions" 1905 shown in FIG. 19 are also relatively different and therefore will be further detailed in FIG. 21. However, the selected menu pull-down and the icon pull-down are exactly the same as those shown in FIGS. 17 and 18, respectively, due to the fact that the objects that are being selected are projects 301.

Turning to FIG. 20 there is shown the views available to a given user, this set of views being more or less directly derivable from the static model in FIG. 3. Owns 2001 is associated with the "owns" relationship of user 303 to project 301. Originates 2002 is likewise associated with a relationship between user 303 and project 301. Another view plays 2003 is provided, representing the members 311 that a given user 303 plays; an interface for that view is described in FIG. 42. The activities view 2004 is a result of a direct association between a user 303 and the activities 302 that were executed by that user. Therefore there is no complex processing involved in building the activities view 2004. Whatnext 2005 is also an interesting view associated with a user 303, and it shows just those projects 301 that this particular user is responsible for moving from one state 305 to another. Therefore, the list of projects 301 that is returned for the whatnext view depends on if this user is the one associated with the next action. So the processing involved is to iterate through those projects 301 "owned by" a given user 303 and determine if the projects 301 whatnext returns a non-empty list. If it does not return an empty list, i.e., if it returns that the project 301 is in an active state in progress 42 or ready 45, then it is an indication that this user is responsible for executing the action moving it to the next state. The resulting list of those that pass the test are returned as part of the whatnext view. The benefit of the whatnext view is to show those actions that are candidate actions for the current user whereas "owns by" is not enough nor is "originates" enough by itself.

The final view associated with a user is the properties view 2006 which simply shows the attributes like name and default view, etc. that can be updated or reviewed by the user.

Turning to FIG. 21, which results when the actions pull-down 1905 is invoked, the main actions are very similar to those associated with other windows. There are really three forms of create that could take place: (1) the create project which is the ad hoc process 304 shown in 2101; (2) open project 2102 which really is intended to open one associated with a process; (3) and open test project 2103 which would allow a project 301 to be opened in the test mode associated with the dynamic models shown in FIG. 5. The transition there would be 502. This open test project 301 would only be allowed when a process 304 selected is in the completed state.

Figure 22:
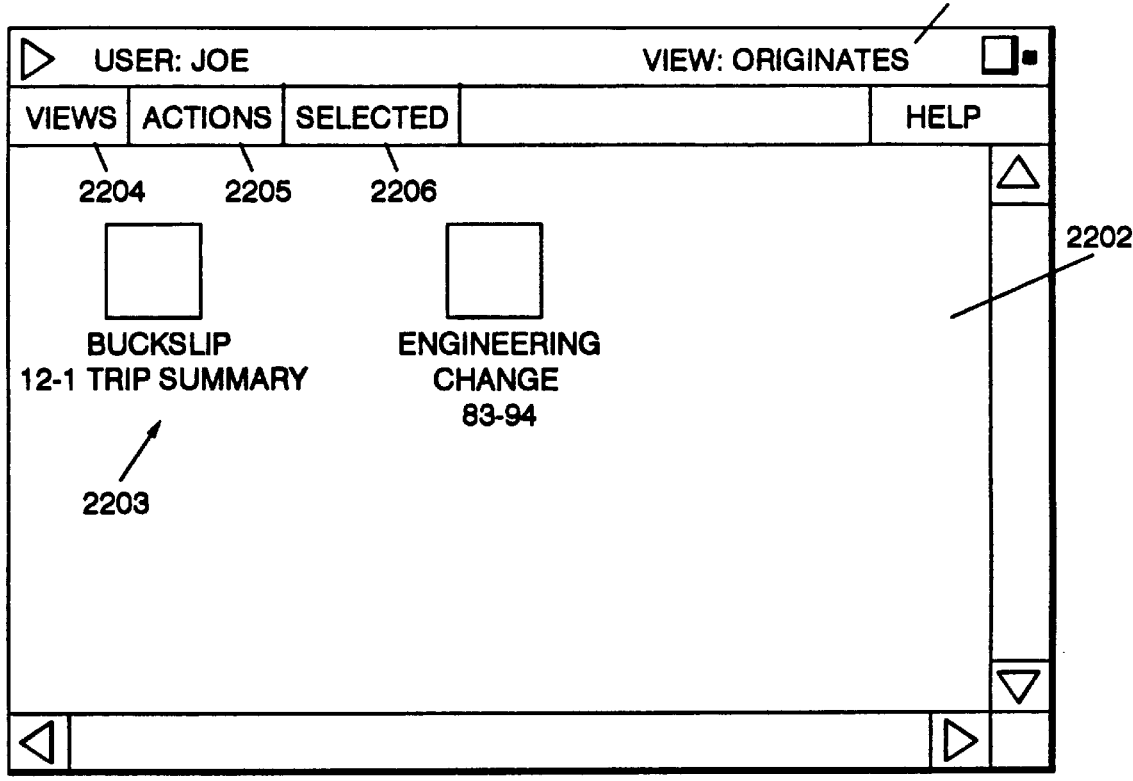
FIG. 22 illustrates a graphical user interface showing origination associated with a particular user.

If from the owns view shown in FIG. 19, the views 1904 program is activated and the originates view 2002 is selected, then FIG. 22 would be the result and in that case it would just show those projects 301 that are "originated by" a given user 303. Therefore, the window shown in FIG. 22 would have a title bar 2201, and the field 2202 would show a list of icons that represent those projects that Joe originated. For example, buckslip 12-1, trip summary 2203. The menu bar would be exactly the same as any other menu user bar, with views 2204 processed as shown in FIG. 20 and actions 2205 handled as in FIG. 21, and selected 2206 handled very much like that associated with FIG. 17. The icon menu would be handled like that shown in FIG. 18.

Figure 23:
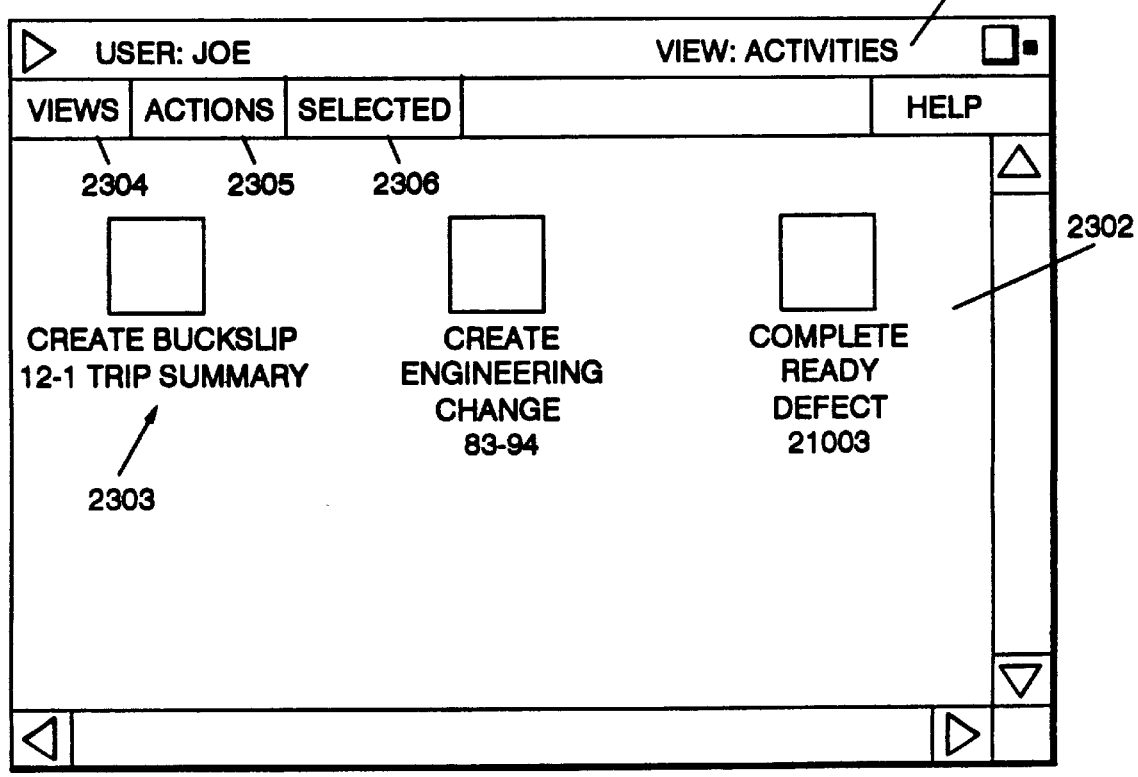
FIG. 23 illustrates a graphical user interface showing activities associated with a particular user.

Assuming that the activities view 2004 is chosen (FIG. 20), then a window such as shown in FIG. 23 may be displayed to illustrate the processing. The title bar 2301 would show user Joe view activities in this case, while the field 2302 shows a list of icons representing the activities 302 that Joe has executed with 2303 showing the create buckslip 12-1 trip summary. Again, views 2304 corresponds to FIG. 20. Actions 2305 would cause FIG. 21 to be invoked or displayed. Selected 2306 would cause the pull-down shown in FIG. 17 to be displayed. The icon menu, which would be displayed when selected, is shown in FIG. 18. Again, the processing would be similar as discussed above.

Figure 24:
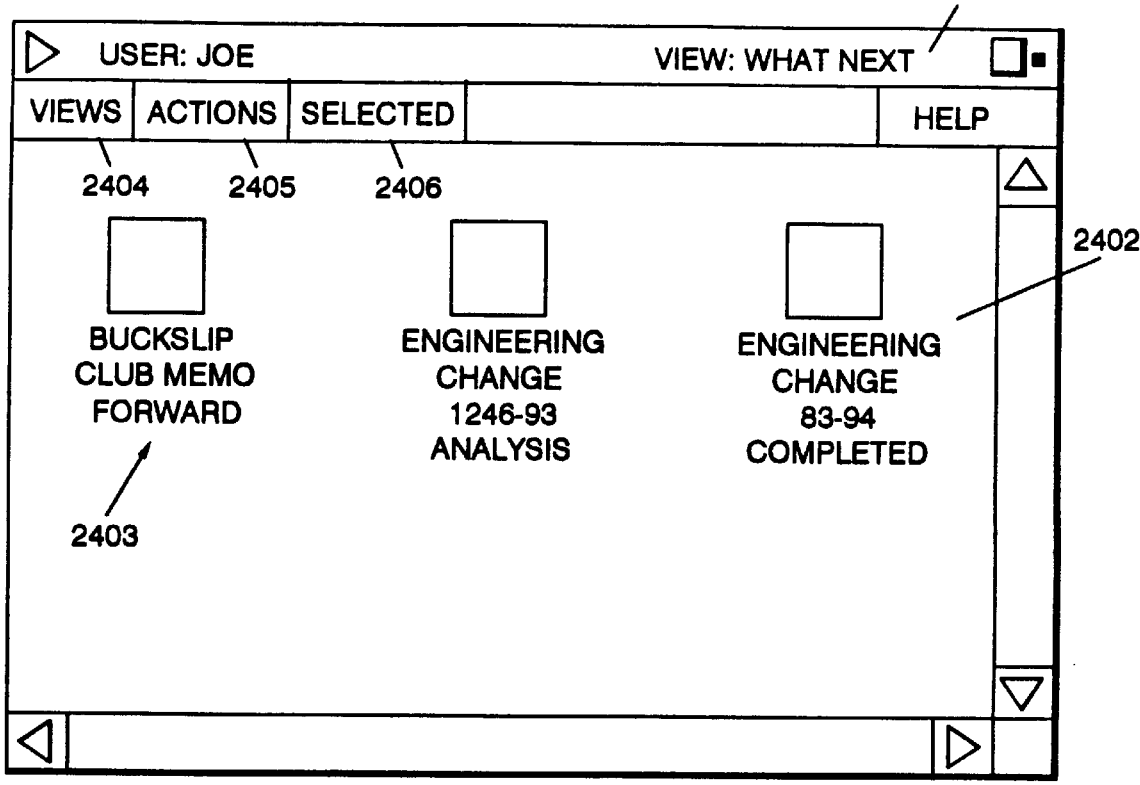
FIG. 24 illustrates a graphical user interface showing whatnext associated with a particular user.

Returning to FIG. 20, if the whatnext view 2005 is selected, FIG. 24 would be illustrated with the title bar 2401 showing user Joe the whatnext view. The field 2402 shows a list of icons representing projects 301 ready to be completed one direction or another. One example is represented by icon 2403 which shows buckslip club memo forward which would indicate the state of the process 304. The processing as shown from the menu bar item is similar as described above. Views 2404 would be handled the same as described with respect to the menu pull-down shown in FIG. 20, and actions 2405 would be handled the same as described in the menu bar shown in FIG. 21 and selected 2406 would likewise be handled via the pull-down described and shown in FIG. 17. The icon menu would be displayed and acted upon as that described in association with FIG. 18.

Figure 25:
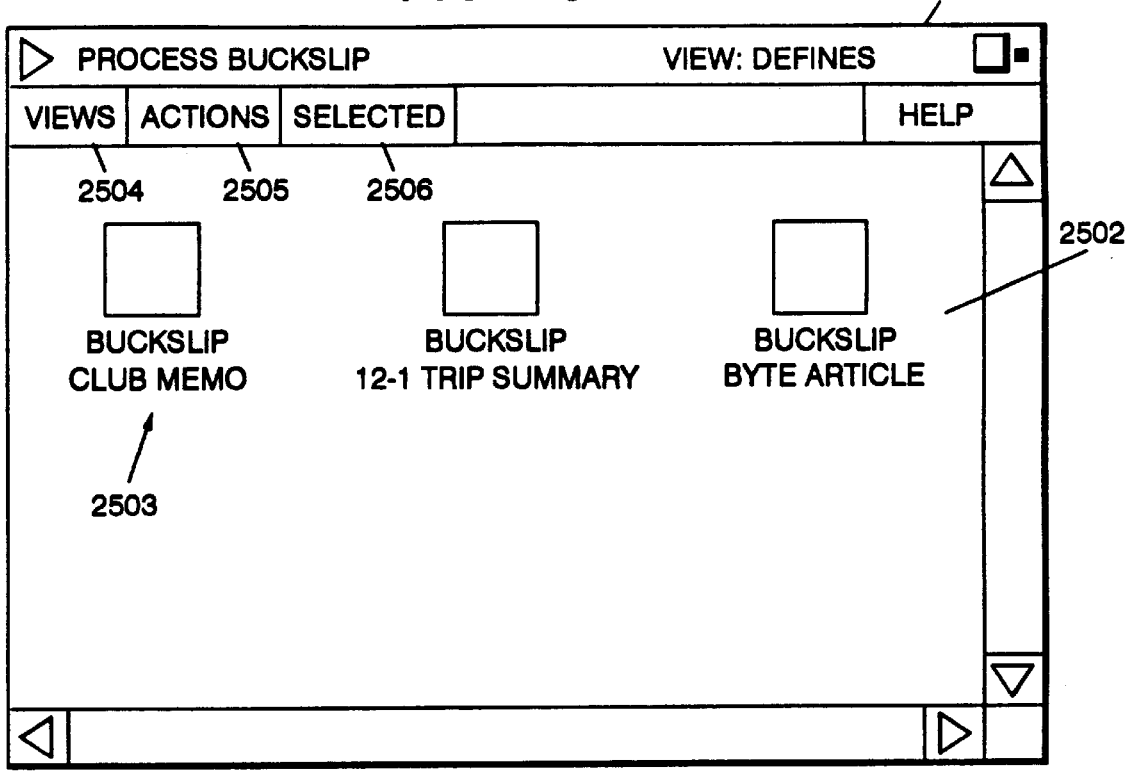
FIG. 25 illustrates a graphical user interface showing process buckslips.

Referring back to FIG. 11, assume a particular process 304, i.e., buckslip 1103, is selected, FIG. 25 shows a potential screen that can be used to provide a user interface for functions associated with that process 304. In this particular instance, the title bar 2501 shows "process buckslip view defines". The field 2502 shows icons representing the particular buckslips that have been created using this process 304 and that are in some point in that process 304. One icon buckslip club memo 2503 is one such icon. The menu bar, like the other windows, has views 2504, whose action is described with a pull-down menu shown in FIG. 26. Actions 2505 would likewise be shown through FIG. 27. And selected 2506 and also the icon menus would be shown as illustrated in FIGS. 17 and 18, respectively.

Figure 26:
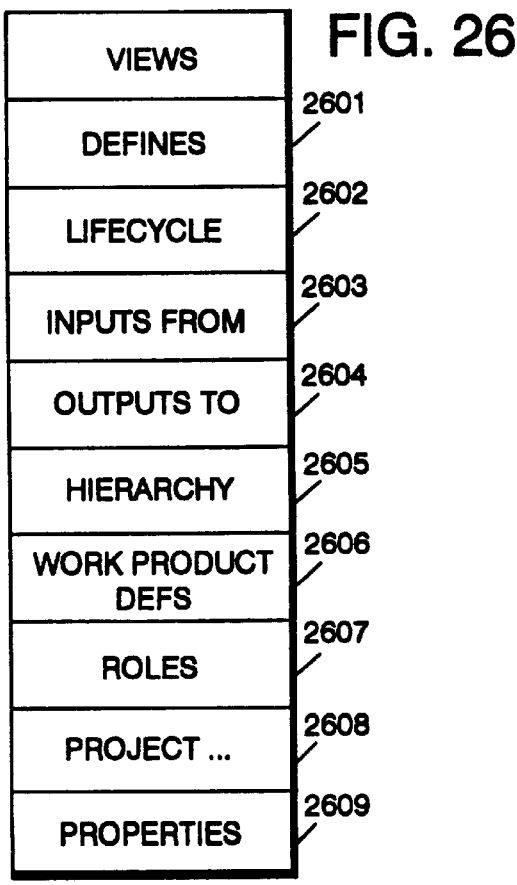
FIGS. 26 and 27 illustrate drop-down menus associated with the user interface illustrated in FIG. 25.

Turning to FIG. 26, if the views 2504 is selected, the items shown will correspond more or less directly to those shown in the process 304 object on the static model shown in FIG. 3. The "defines" view 2601, would show the list of projects for which this process 304 is currently the defining process 304. The "lifecycle" 2602 would show the states 305 and transitions 306 of the lifecycle. The "inputs from" 2603 and the "inputs to" 2604 correspond directly to the list associated with the process 304 object 304 and are not described as a separate figure; they are treated similar to FIG. 11.

The "hierarchy" 2605 corresponds to the superclass/subclasses relationship between processes 304. Again, it is very much like the PLM system view processes screen shown in FIG. 11 except that the display of it is going to look very much like a hierarchical display graph with the superclass above, the process 304 of focus in the middle, and then the subclasses below (see FIG. 37). The individual processes are selected similarly as described in FIG. 11 with the same menu bar pull-down items as described in FIG. 11.

Next, the "work product definitions" 2606 corresponds to processes that are contained within this particular process 304 and represents the definition of work products for a given process 304. For example, within a release process 304, one might have increments. Those would be the work products associated with a given release.

Roles 2607 is derived from the roles 314 list of a process 304.

The "project" view 2608 cascades a menu that looks like the views menu shown in FIG. 20, i.e., it shifts the point of view from a process 304 point of view to a project 301 point of view. This is allowed because a process 304 is a kind of a project 301 and therefore one can look at who owns the process 304 as shown in FIG. 20, who originated the process 304, what activities 302 have been associated, the history, properties, etc. Finally, "properties" 2609 which would, again, be very much like properties on any other object described above would show the name and maybe default views, etc., which could be set or reset by the user.

Figure 27:
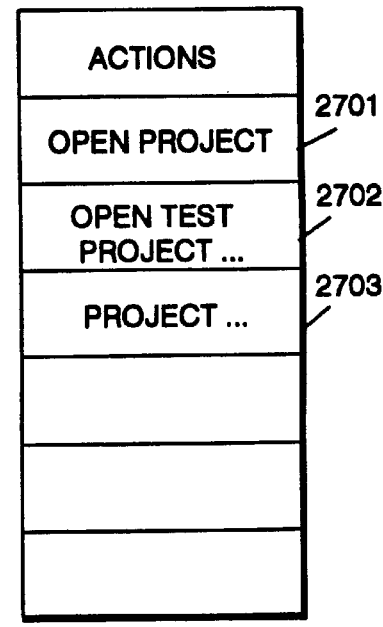

Turning to FIG. 27, when the actions pull-down 2505 is selected, this is going to look very similar to FIG. 14 with the open project 301 and the open test project 301. The only difference is that the view is no longer necessary since it is already in the view of that given project 301. Open project 2701 would be shown in an equivalent manner as open project 1402 in FIG. 14, and open test project 2702 would be equivalent to open test project 1403 in FIG. 14. Any actions put on one menu should be associated with the other. Finally, on FIG. 25, since the objects represented on the field are actual projects 301, then the selected menu 1505 in FIG. 17 is the one that applies and the selected icon menu shown in FIG. 18 applies if a direct manipulation of the icon is in order.

Figure 28:
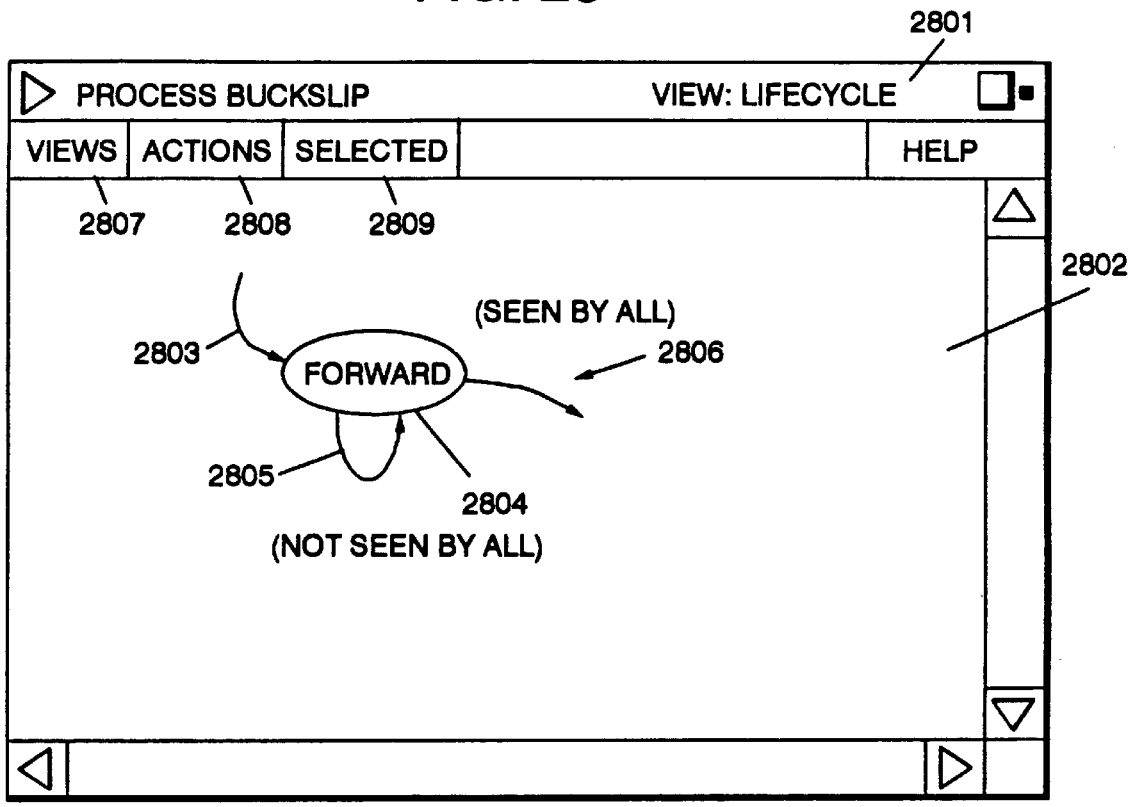
FIG. 28 illustrates a graphical user interface showing a lifecycle.
Figure 29:
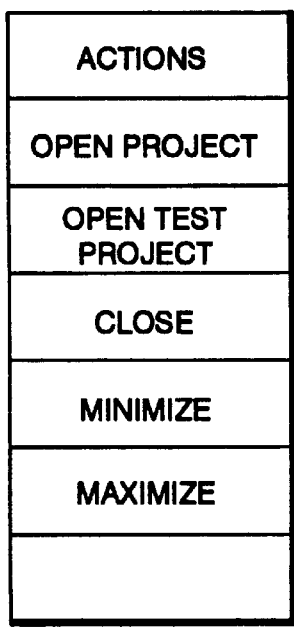
FIGS. 29, 30 and 31 illustrate drop-down menus associated with the illustration in FIG. 28.
Figure 30:
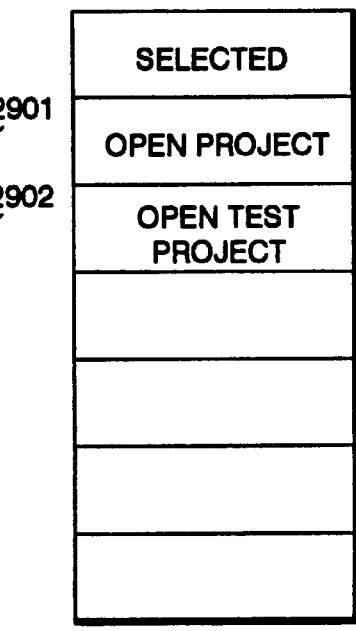

FIG. 28 represents a lifecycle view of a process 304 or a project 301, depending on how it is invoked. If it is invoked from a screen such as FIG. 25 or the lifecycle view is selected, then the window in FIG. 28 represents a specific process 304 whereas if it is invoked with respect to a given project 301 where process is selected as was described in FIG. 20 from a project 301 point of view, the window will have a title bar 2801 with "process buckslip view lifecycle." The field 2802 will show a graphic representation of the process lifecycle with states 2804 such as forward, and transitions such as 2803, which shows the create type transitions from no state to the forward state showing a transition from a state to a state, in this case the same one, 2805 from forward to itself. And then also from a state to no state such as that shown in 2806. The action bar pull-down 2808, again, is very similar to views 2807 which will be described exactly as discussed in FIG. 26 with any other process-type views pull-down. Actions 2808 will be described according to FIG. 29, which will display the pull-down. Selected 2809 is displayed in FIG. 30 and the icon menu is displayed in FIG. 31. If actions 2808 is selected (FIG. 29), then, again, what is shown is the ability to open a project 2901 and open a test project 2902 that are very similar to other process related actions. Other window actions like close, minimize and maximize, etc. may be in that pull-down as well.

Selected 2809 is different in a sense in that the selected items are going to be either states or transitions so therefore even though the functions look similar, i.e., open project 301 3001 and open test project 301 3002, there is a difference in that in the case where a state is selected, the indication is that a project 301 in that particular state is requested and therefore, if there is only one transition, then that transition will be selected. If the transition is selected, then that specific transition is the one that will be used to create the given project 301.

Figure 31:
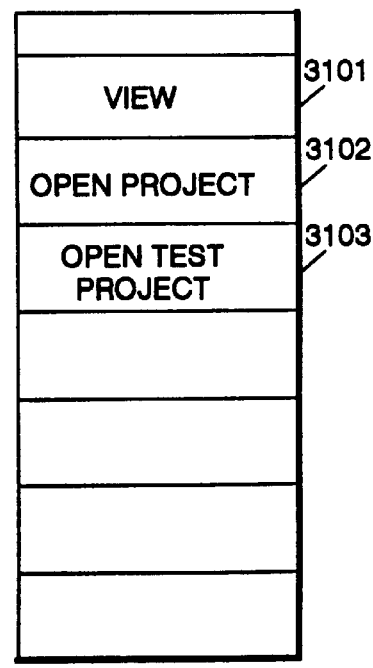

FIG. 31 shows the icon menu, which includes view 3101, which would provide a particular view of the state 305 or transition 306 selected. Open project 3102 and open test project 3103 correspond directly to those shown in FIG. 30, except that a given transition or state, a single one, is selected.

Figure 32:
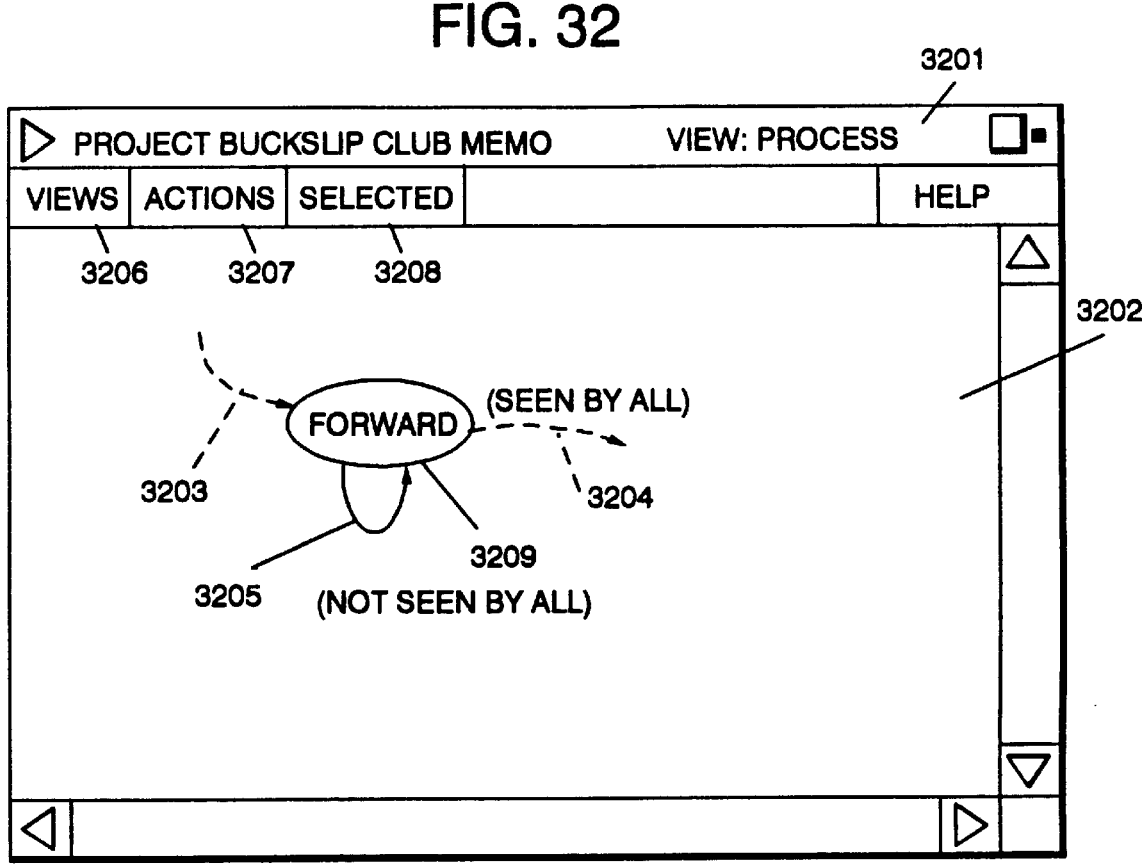
FIG. 32 illustrates a graphical user interface showing a process from a particular project's point of view.

Turning to FIG. 32, which is going to show a process 304 from a particular project's 301 point of view to allow direct activation, a window shows title bar 3201, with project, buckslip, club memo, view: process. The field 3202 is like as shown in FIG. 28 and show states and transitions. However, inactive states and transitions (i.e., those that are not currently available) will be in dotted lines, or some other indication to show that they are not selectable. They are not part of the current state. This screen could be used also as a user interface to allow selection when multiple transitions are possible. In other words, this window could pop up and describe those transitions that could be taken. In a sense, this function is available two different ways. One is just by selecting the process view of a project and the other is by virtue of getting it as a dialog. Again, as the field 3202 shows, transitions such as 3203 that were taken to create the buckslip in the forward state are is no longer available. Similarly, since the buckslip has not been seen by all, the transition 3204 out to no state, which implies it is complete, is not available either and therefore shown in dotted line. State 3209 is bold or is not in dotted lines and shows that the forward state is the active state, and transition 3205, meaning that the buckslip has not been seen by all, indicates the active transition. So in this case there is only one active transition. And if one was to do the complete transition on this project 301, it would basically take that transition automatically.

The views 3206, actions 3207, and selected 3208 menu bar items are very similar, although have differences in content. The actions 3207 menu bar is described in FIG. 34 and the selected 3208 menu bar is described in FIG. 35, and the icon menu will be shown in FIG. 36. A key here is that only selectable items are transitions. States are not selectable with respect to the direct selection.

Figure 33:
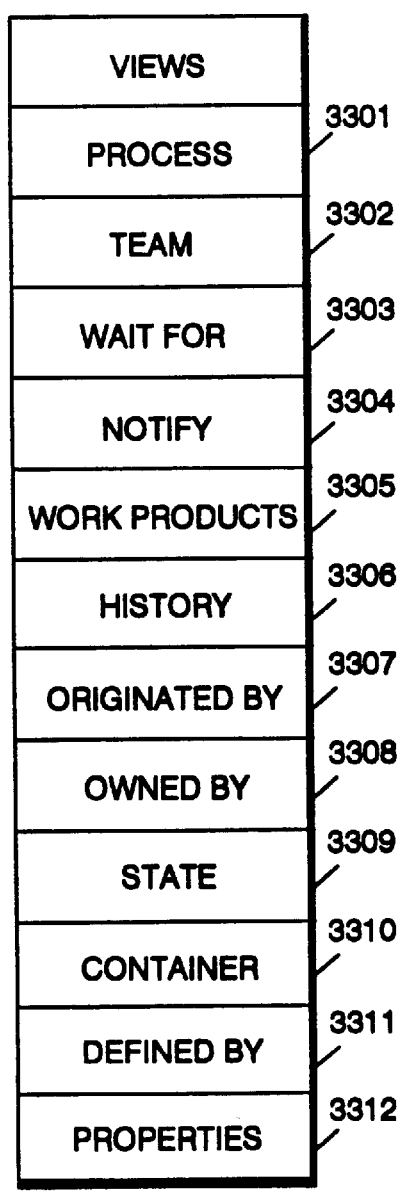

Referring now to FIG. 33 with the views 3206, again it is relatively useful to refer back to FIG. 3 to see where most of these derive from. The process 304 view 3301 as is actually a view that passes through the "defined by" process 304 associated with a project 301 and if that is non-null, then it shows the lifecycle, but it also captures information contained in the "controlled by" state 305. So if no state were active right now, in other words, if the project 301 was in the waiting state, then one would view that the "controlled by" would be null and therefore the object or the project 301 would have a dotted line around forward and the not seen by all transition. And that is just to take advantage of the current state of the project 301 as shown in the dynamic model FIG. 4. Team 3302 is an interface further described in FIG. 43.

Wait for 3303, notify 3304 and work products 3305 show the projects 301 with which this one is associated. Another view container 310 shows the project 301, if any, of which this project 301 is considered to be a work product. That is a single process 304 view there instead of a multiple process 304 view so that one is slightly different in that it will bring up a default view of the project 301 in which this one is a container. The history view 3306, shows the history of a project 301 which is a list of the activities 302 that have occurred. And the originated by view 3307 shows a view similar to FIG. 19 which is a user view. The owned by view 3308 is very similar. Also, a user view as exemplified in FIG. 19. The state view 3309 will show the current state with respect to it being very much like a process 304. In this case, though, what it defines happens to be projects that are in that state. So again, that will be like any process 304 view as shown in FIG. 25. Properties 3312, is like all the other properties discussed before. Defined by 3311 shows the process 304 not as associated with this object, but as a definitional unit, so therefore it is really a shift of focus. Process 3301 switches to the view shown in FIG. 32, whereas the defined by 3311 switches to the view shown in FIG. 28, which is just a generic view of that process 304 and by default it is lifecycle being the default view of a process 304.

Figure 34:
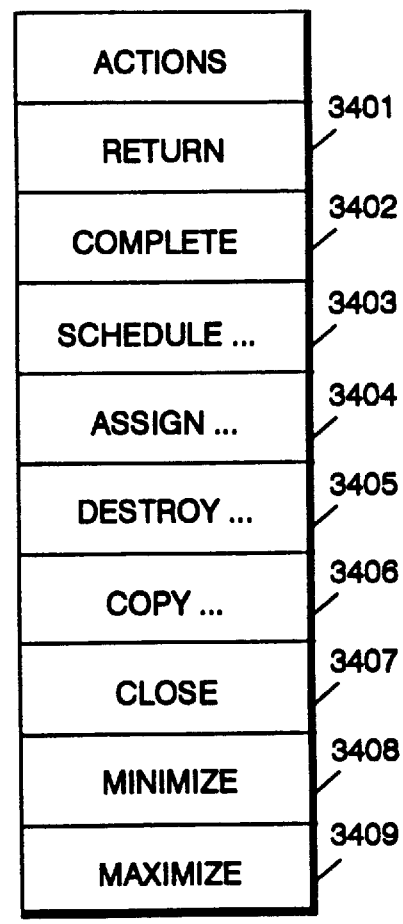

Turning to FIG. 34 with actions, shown are the return action 3401, the complete action 3402, the schedule action 3403 and the assign action 3404 very similar to those described in the dynamic model of FIG. 4. If there is more than one transition, then choosing it from the actions perspective will cause a selection dialog to appear as described above. The destroy 3405, copy 3406, close 3407, minimize 3408 and maximize 3409 and are similar to these on other menus described above.

Figure 35:
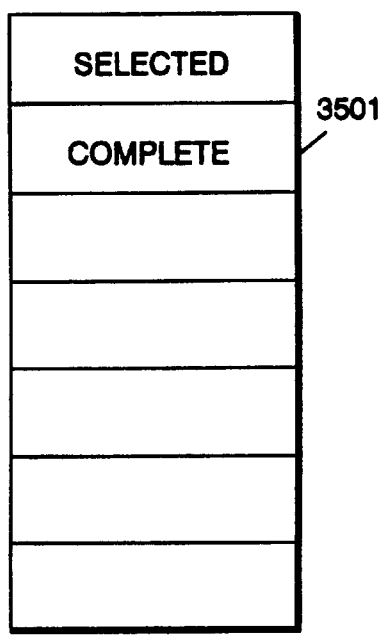
FIGS. 33–36 illustrate drop-down menus associated with the user interface illustrated in FIG. 32.
Figure 36:
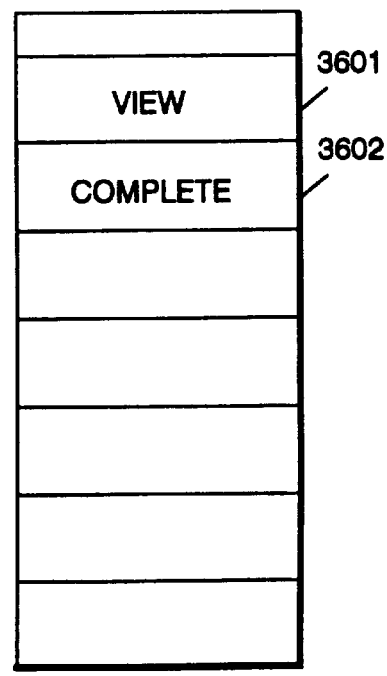

FIG. 35 details the selected box 3208. The things selectable are transitions, and the only action that can be performed on a transition at this point is complete. If one wants to shift the view, then FIG. 36 shows an icon menu wherein 3601 shows view, which would provide a view of the transition as according to FIG. 28, in case it happens to be a complex transition. If the transition is not complex, then it may show the activities defined that invoked this transition.

Figure 37:
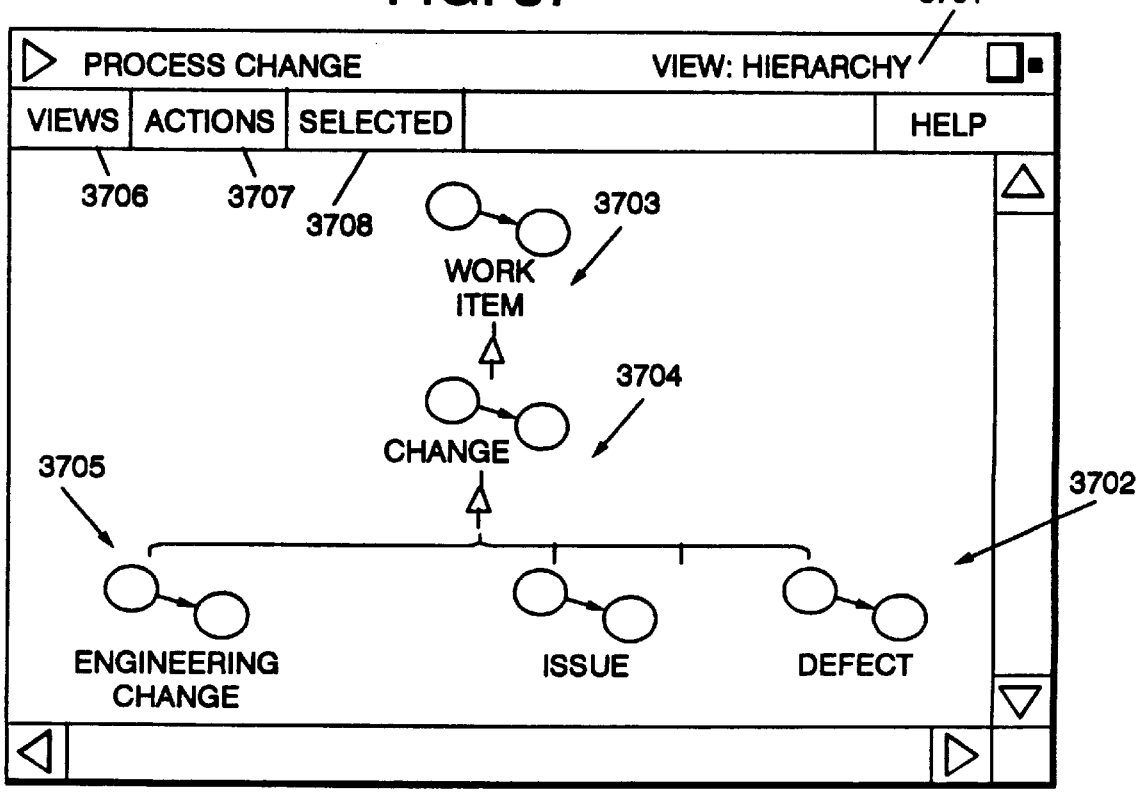
FIG. 37 illustrates a graphical user interface showing a hierarchical view of a process.

FIG. 37 shows a hierarchical view of a process 304. The title 3701 has "process, change, view: hierarchy. The field 3702 shows a basic hierarchical view of the processes. In all other respects, it is exactly the equivalent of the other process 304 screens, such as FIG. 11, that just shows multiple processes. The parent class or the superclass 3703, is "work item". The "change" 3704 happens to be the current process 304. And a subprocess 304 "engineering change" 3705 shows in more or less a hierarchical fashion what inheritance structures might be taking place to provide definitional elements of the process 304. In terms of the menu bar items, views 3706, is handled exactly like any other process 304-type view. Actions 3707 and selected 3708 are also handled exactly the same as any other process oriented screen such as shown in FIG. 26 with the views, FIG. 27, etc.

Figure 38A:
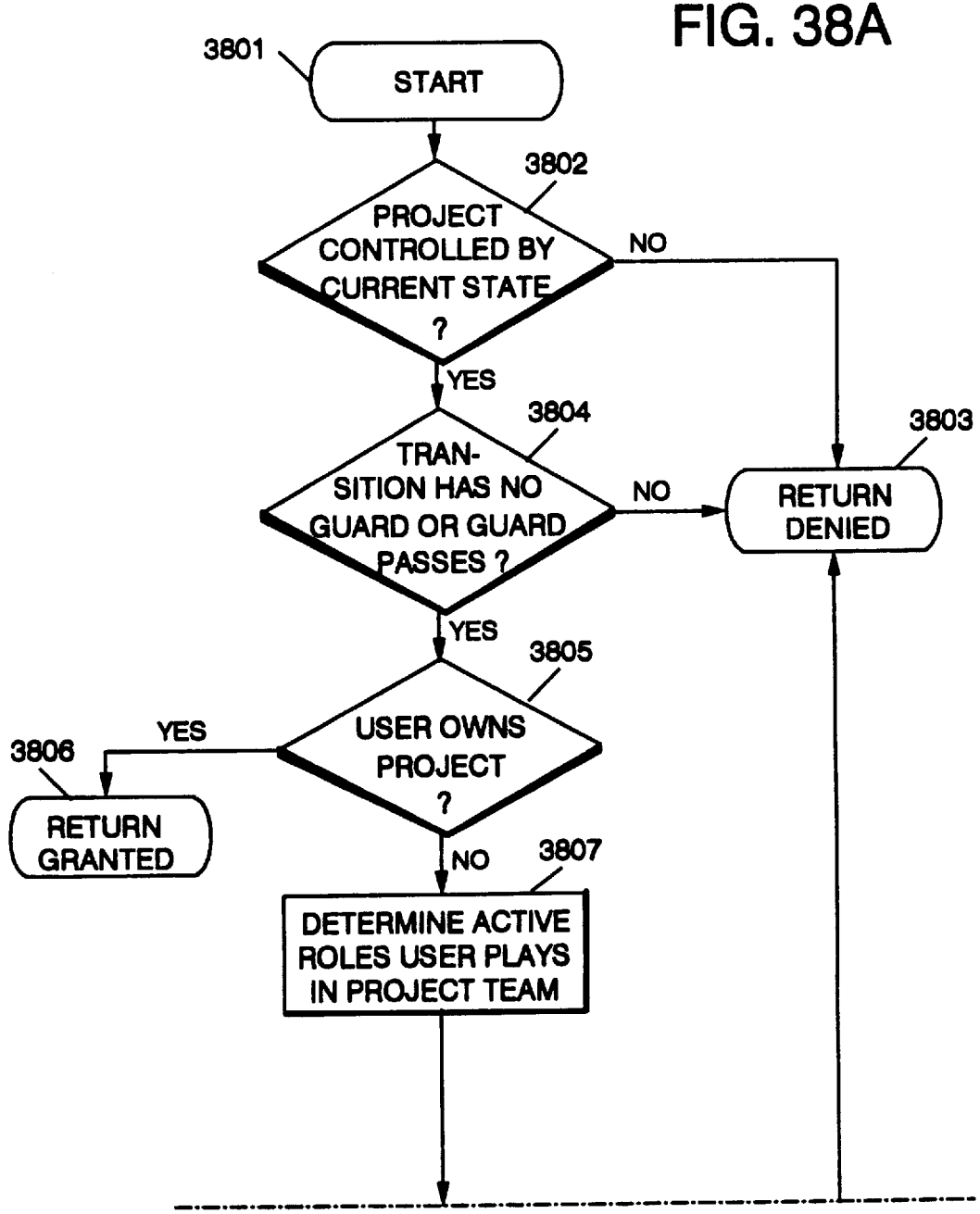
Figure 38B:
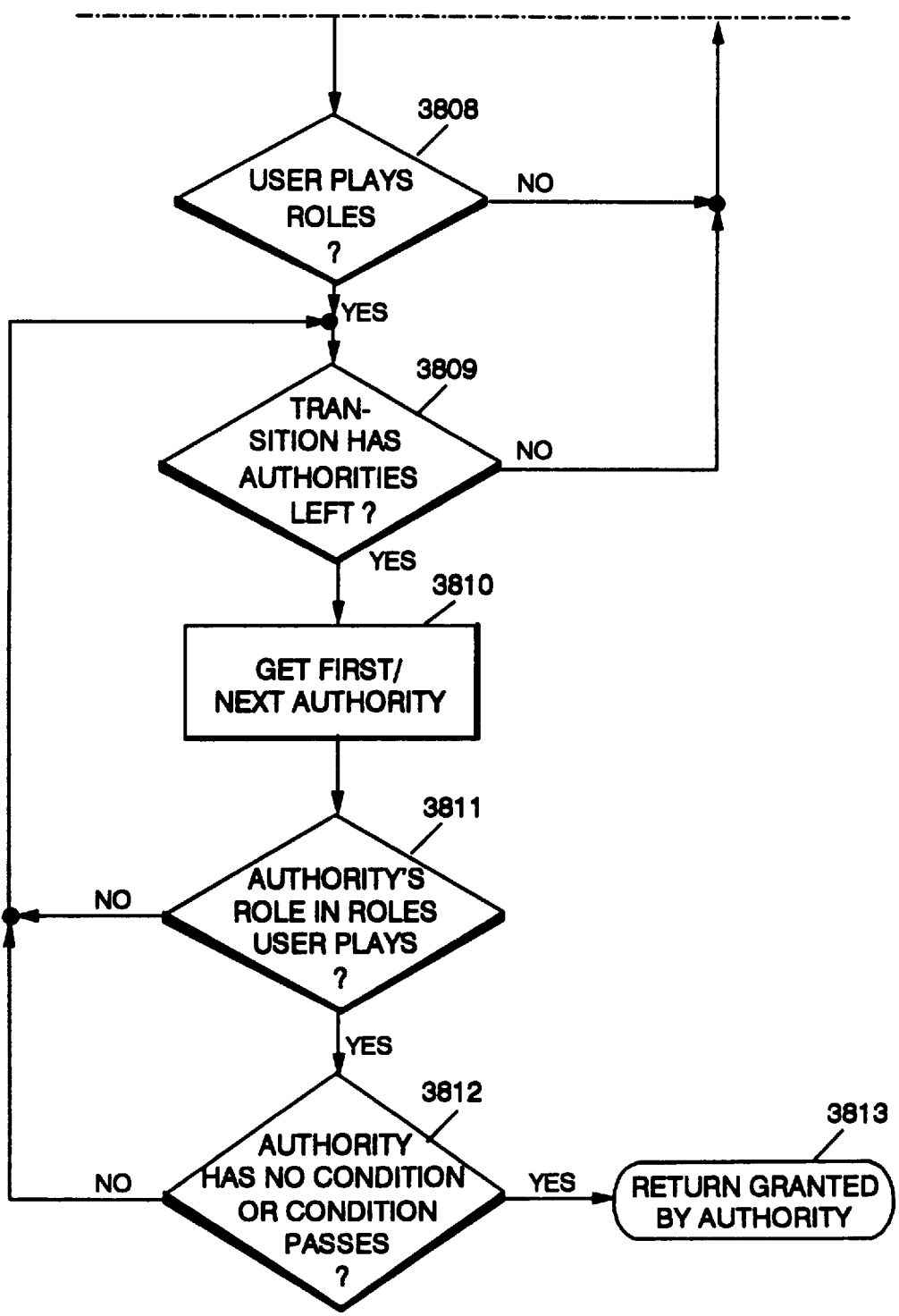

Referring to FIG. 38A–38B, there is illustrated a method to determine authority 310 to execute a complete transition 415, 417, 445 from a project 301 "in progress" 42 as shown in the dynamic model of FIG. 4. In general, the function that would invoke this method comes during the execution of a "complete" transition 306. At that point, the execution of the method starts at step 3801 where the next step 3802 is to check to see whether the project 301 is controlled by the current state 305. If this is false, then the method returns "denied" at step 3803 to the calling function. If the project 301 is controlled by the current state 305, then the next step 3804 is to check to see whether the transition 306 has no guard or the guard passes. If false, the method also returns denied in step 3803 to the calling function.

If the transition 306 has no guard and the guard passes at step 3804, then the next step 3805 is to check to see whether the user 303 owns the project 301. If this is true, then the next step 3806 is to return "granted" to the calling function. If the user 303 does not own the project 301, then the next step 3807 is to determine the active roles 314 that a user 303 plays in a project team 301. The next 3808 step is to check to see if the user 301 plays any of the roles 314 as determined above in step 3807. If the user 303 plays no such roles 314, then "denied" is returned to the calling function (step 3803). If the user 303 plays such roles 314, then the next step 3809 is to begin a loop that checks to see whether the transition 306 has authorities 310 in its list of authorities 310. If there are none left, then again "denied" is returned to the calling function (step 3803). If there are authorities 310 in the transition 306, then the next step 3810 is to get or retrieve the first or next authority 310 in said list.

The next step 3811 is to check to see whether the authority 310 has a role 314 that is found in the roles 314 the users 303 play as determined above in step 3807. If this is not true, then the loop is initiated again at step 3809. Otherwise, if the role 314 matches at step 3811, then the next step 3812 is to check to see whether the authority 310 has no condition or if the condition passes. If this is the case, then returned "granted" by authority 310 is returned to the calling function where the authority 310 that had just passed is returned. If the authority 310 has a condition and that condition fails, then again, the loop beginning at step 3809 is traversed.

The net effect of this loop is to loop through the authorities 310 associated with the transition 306 to determine if the user 303 can play that role 314 by virtue of being a member 311 of the project team 301. It should be clear that the user 303 that owns the project 301 is always granted authority as seen at step 3806.

Referring now to FIG. 39, there is illustrated a method to determine the roles 314 filled by a user 303 in a given project 301. This function is called as part of the method to determine the authority 310 and, therefore, can be thought of as a subroutine of step 3807. Therefore, the start of this function 3901 corresponds to step 3807 on FIG. 38. The basic function here is to initialize a roles 314 list to be returned empty (step 3902) and then loop through all the members 311 in a project team 301 and then return the resulting list (step 3907). For each member in the list (step 3904), a check is made (step 3905) to see whether the user 303 owns the member, which will be discussed below. If the user 303 does own the member 311, then that member's role 314 is appended to the roles list that will be returned in step 3907.

In general, to determine whether or not a user 303 owns a member 311 depends on the actor 312 that plays that member. Given that an actor 312 is an abstract type that is normally instantiated by user 303, a project 301, or a member 311, this means that there is potentially three different kinds of results, the first of which is if a user 303 happens to play the member 311. Then the check at step 3905 is simply to check to see whether the user 303 that plays the member 311 is the same as the user 303 that is passed into this function. In the case where a member 311 happens to play another member 311 by virtue of the fact that roles 314 can be associated with other roles 314 directly, then it is merely a recursive call to check to see who the owner 303 of the member 311 is that plays the other member 311. In the case where the type of actor 312 is a project 301, then the logic is slightly more complicated and is shown in FIG. 40, a method to determine if a project 301 is owned by a given user 303.

Referring to FIG. 40, there is illustrated a method to determine if a project 301 is "owned by" a given user 303. This function is called as part of the process to determine roles 314 filled by user 303 in a given project 301, as shown in FIG. 39, wherein a specific check is made to see if a user 303 owns a member 311 at step 3905. Therefore, the start 401 corresponds to the start of the check 3905. The logic here is rather simple and involves a loop for each member 311 of the project team 301 as initiated in step 4002. In turn, if such member 311 is retrieved (step 4004) it is checked recursively to see whether the user 301 owns that member 311 (step 4005) as described in FIG. 39 at the check (step 3905) to see whether a user 301 owns the member 311. In this case, the check is a little simpler in result in that if the user 301 owns the member 311, then a true result is returned to the calling function (step 4006). If the user 301 does not own the member 311, then the loop is continued at 4002 until such time as there are no more members 311 left in the project team 301. At this point, then a false is returned to the calling function 4003.

Figure 41:
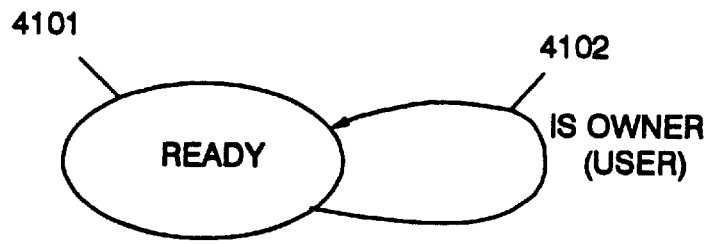
FIG. 41 illustrates a modified portion of FIG. 4.

FIG. 41 shows the dynamic model for a member 311. Because a member 311 inherits from project 301, the dynamic model is equivalent to FIG. 4 except that the ready state 4101 is overridden to allow for an "is owner" transition 4102 as was described as part of the recursive member 311 check in the logic of the method to determine roles 314 filled by a user 303 in a given project 301 of FIG. 39 at step 3905. In all other states of the process of the project 301 as shown on the dynamic model of FIG. 4, the "is owner" method returns false. Only in the case of a ready member 311 would the "is owner" method potentially return true at transition 4102.

Figure 42:
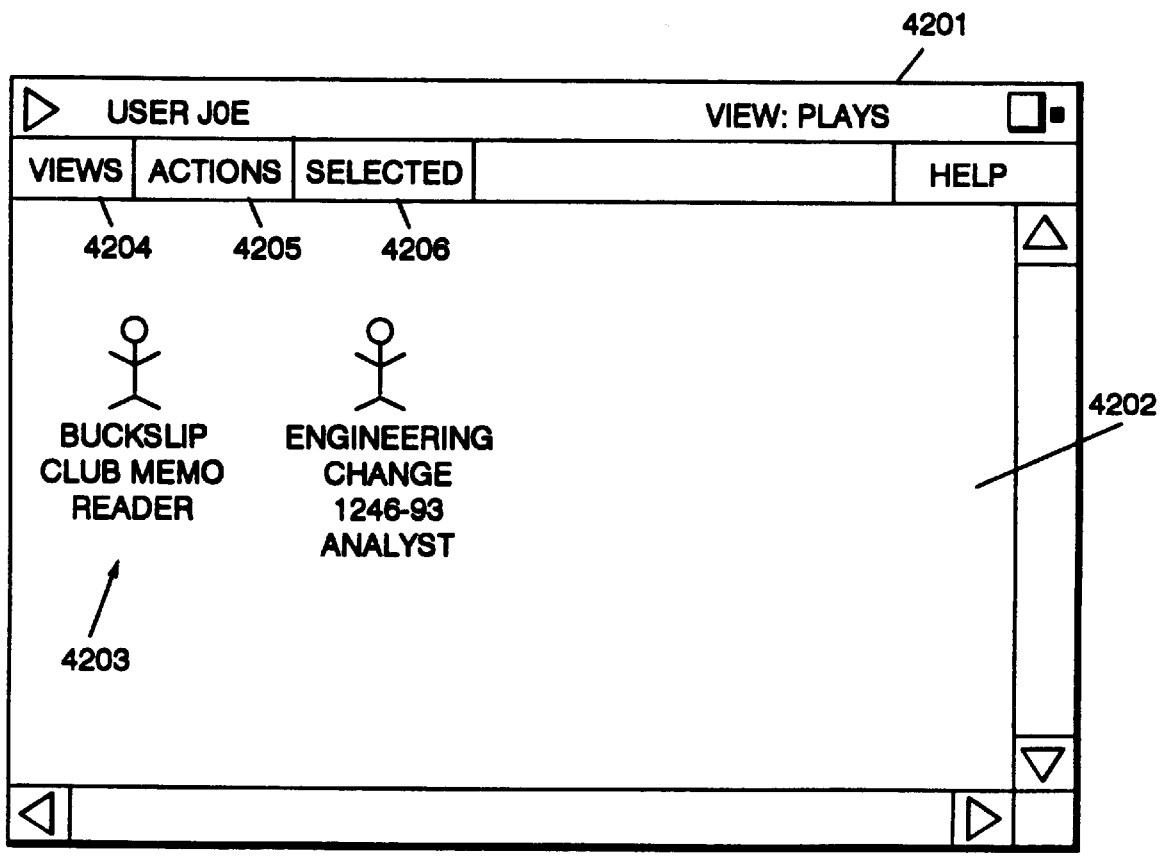
FIG. 42 illustrates a graphical user interface illustrating plays for user Joe.

Referring now to FIG. 42, there is shown a window with title bar 4201: User Joe, View: Plays. The field 4202 shows the members 311 that user 303 Joe plays by virtue of being an actor 312. In this instance, one of the members 311 is buckslip club memo reader 4203. The menu bar shows views 4204, actions 4205, and selected 4206. Views 4204 will be described in FIG. 20, actions 4205 will be described in FIG. 44, and selected 4206 will be described further in FIG. 45. The icon menu associated with a given icon 4203 will be described in FIG. 46. In all other ways, the window shown in FIG. 42 will act like the others described in this disclosure.

Figure 43:
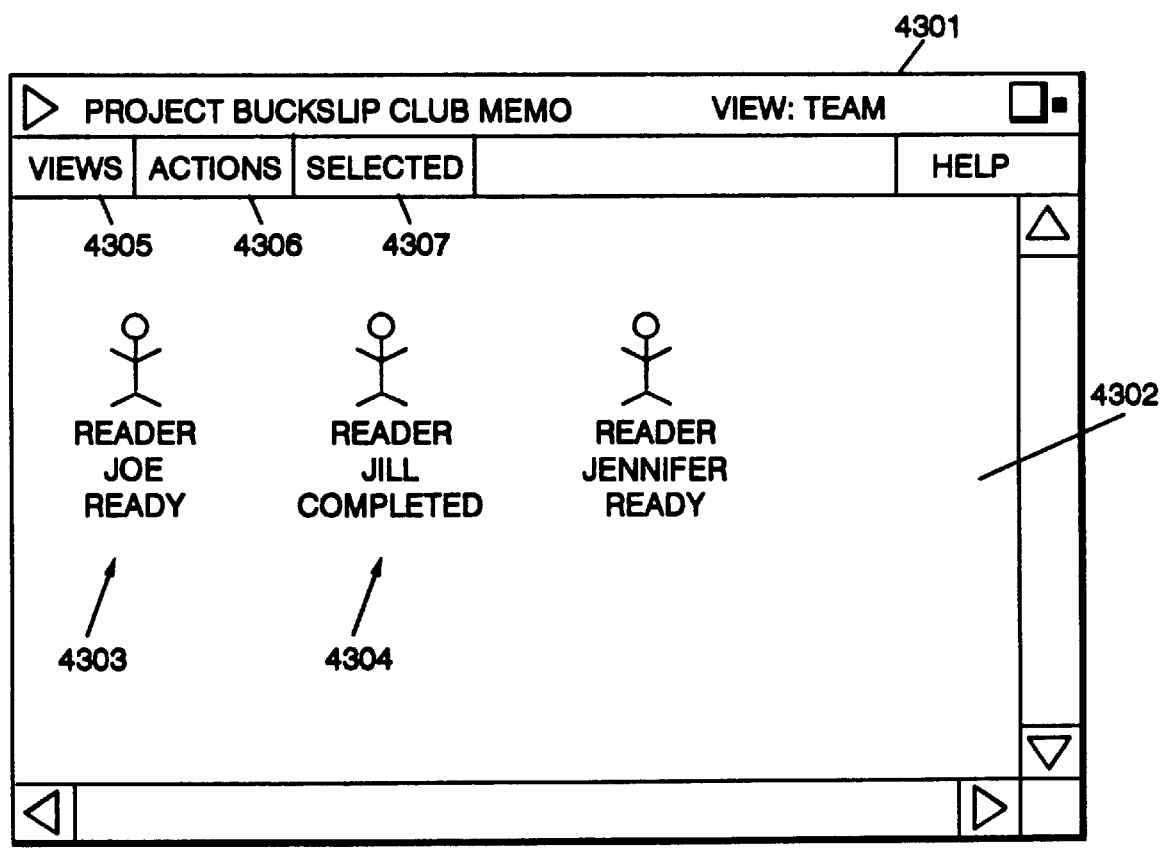
FIG. 43 illustrates a graphical user interface showing a window of a team for a project.

Referring now to FIG. 43, there is shown a window with a title bar 4301: Project Buckslip Club Memo, View: Team whose field 4302 shows that members 311 associated with the particular project 301 buck club memo. In this case, the label of the icons 4303, 4304 shows the role 314 reader as well as the state 305 of the member 311 to indicate whether or not it is available for use. In this particular case reader Jill completed 4304 indicates that Jill has already viewed the buckslip and no longer needs to respond. The menu bar shows views 4305 which will be described in FIG. 33, actions 4306 which will be described in FIG. 44, selected 4307 which will be described in FIG. 45, and the icon menu associated with any of the icons 4303, 4304 will be described and shown in FIG. 46. In all other ways, FIG. 43 acts just like a regular window as described elsewhere in this disclosure.

Figure 44:
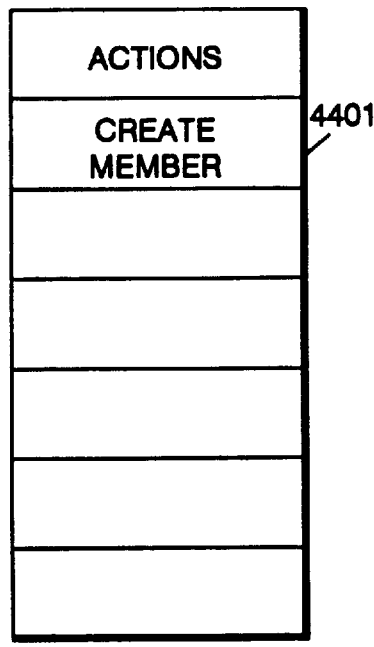
FIGS. 44—46 illustrate drop-down menus associated with the window of FIG. 43.

Referring now to FIG. 44, there is shown the actions 4306 pull-down associated with FIG. 43 Team window. The main function of interest here is the create member function 4401 where a new member 311 can be associated with the project 301 team. In all instances, the user 303 that is enabled to do a create member 4401 is the owner of the project 301. The other normal action functions such as close, minimize, maximize, are now assumed to be a part of any particular actions window. This is for illustrative purposes only and is not meant to be a complete user interface description.

Figure 45:
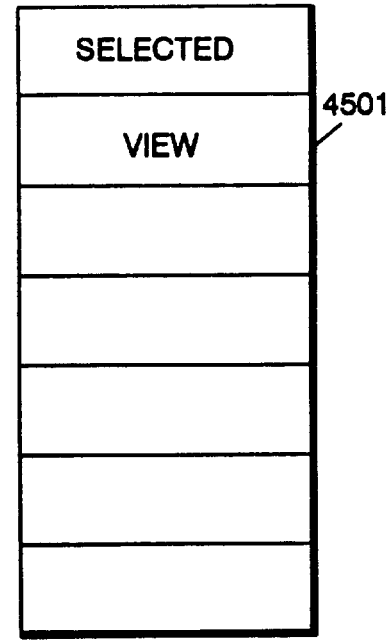

Referring now to FIG. 45, there is shown the selected 4307 pull-down associated with the team view window in FIG. 43, wherein the main function of interest is the view 4501 which would cause a shift of focus to the icon selected.

Figure 46:
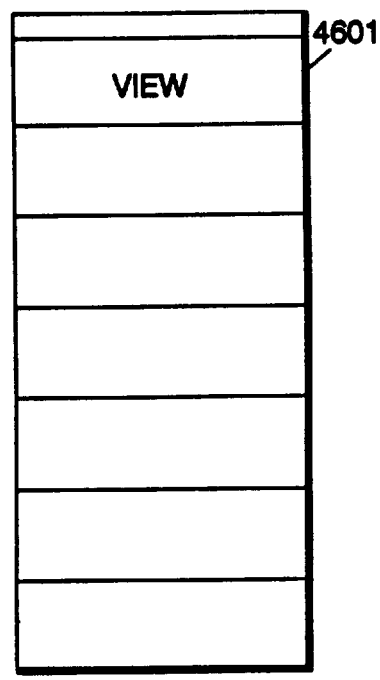

Referring to FIG. 46, the selected icon menu view 4601 enables one to look at the details of a given member 311.

The purpose of the views shown in FIGS. 42 and 43 is to show how easily the user 303 will be able to traverse various members 311 and roles 314 in the system with respect to a project 301 and the project team.

Figure 47:
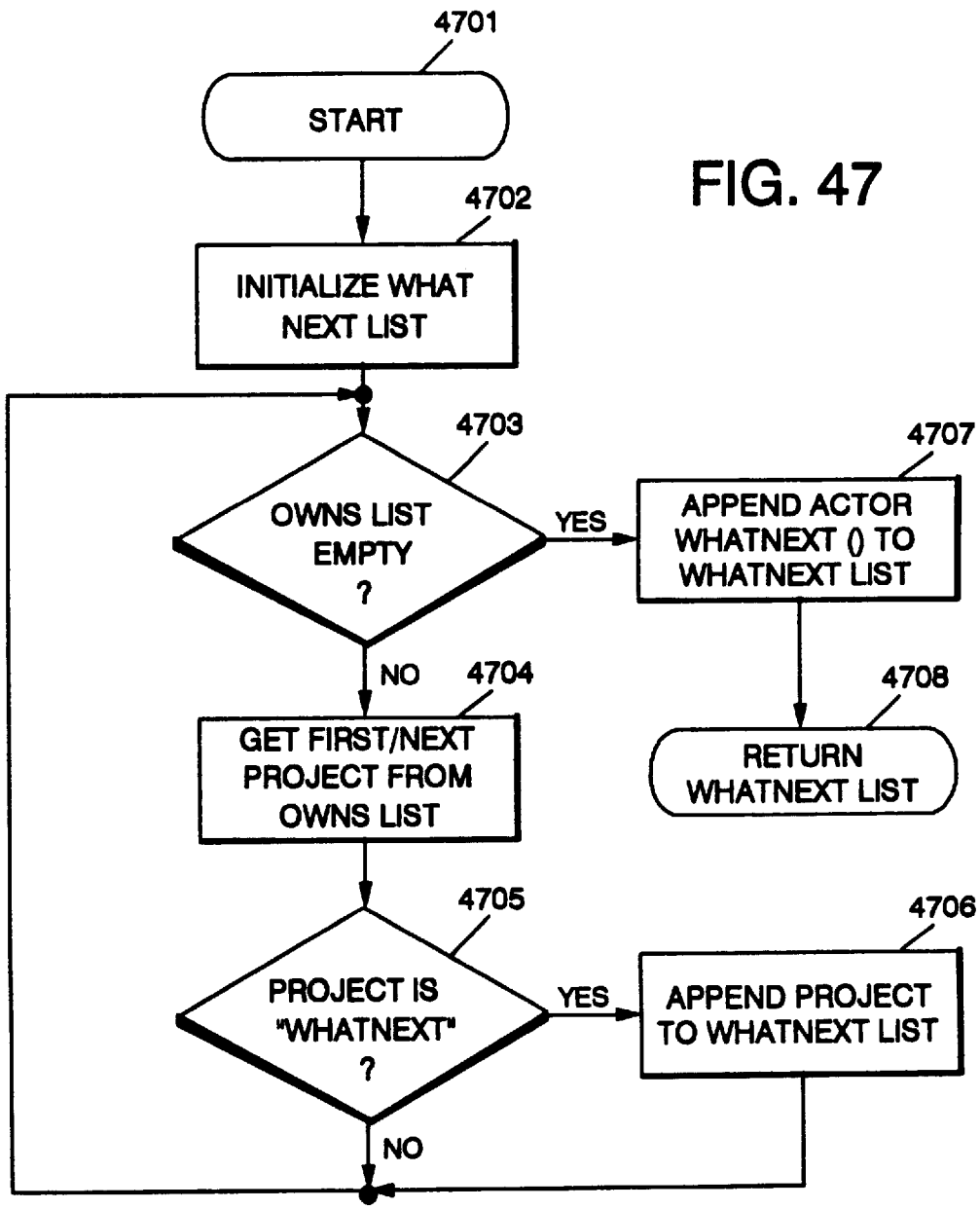
FIG. 47 illustrates a flow diagram of a method to determine whatnext for a given user.

Referring now to FIG. 47, there is shown a method to determine a whatnext 2005 for a given user 303. This function is meant to be called usually from a user input screen from one of the user views. Starting at step 4701, at step 4702 the whatnext list to return is initialized. Then the user 303 owns list of projects 301 is checked at step 4703 to see if the list is empty. If not, then the next step 4704 that makes up the main body of the loop is to retrieve the first of the next projects 301 from the owns list of the user 303. After the project 301 is retrieved, then it is determined at step 4705 whether or not the project 301 is in a state 305 requiring user explicit actions to move it to the next state. This function is discussed as the whatnext transition seen in the various states of the dynamic model of FIG. 4: 406, 418, 431, 443, and 437. If it is determined that the project 301 is waiting on explicit user 303 input, then the next step 4706 is to append the project 301 to the whatnext list initialized in step 4702. In either case, whether the project 301 is whatnext or not, the loop continues at step 4703 until such time as the list is empty. At that point, the next step 4707 is to append the whatnext list according to the method associated with an actor 312. This method will be described further in FIG. 48. After this append in step 4707 is completed, the resulting whatnext list is returned to the calling function in step 4708.

Figure 48:
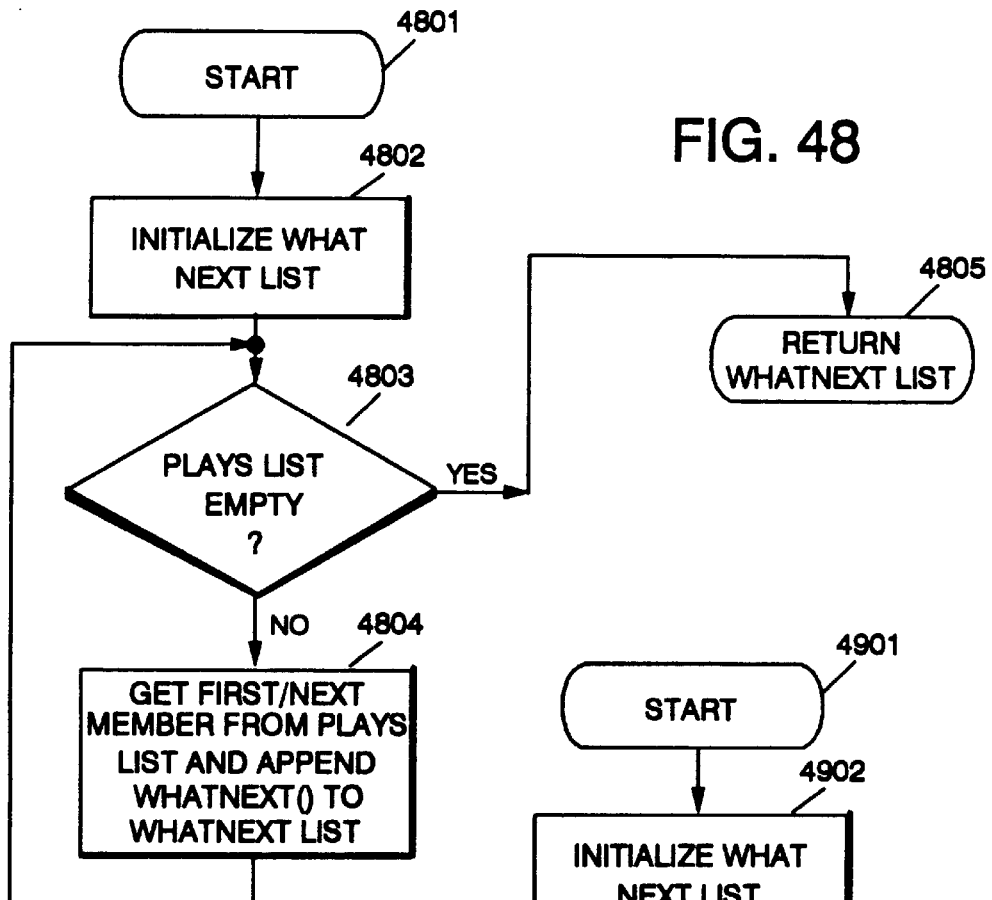
FIG. 48 illustrates a flow diagram of a method to determine whatnext for a given actor.

Referring now to FIG. 48, there is shown a method to determine whatnext 2005 for a given actor 312. This function is normally called with respect to projects 301, members 311 and users 303. Once the function begins at step 4801, the next step 4802 is to initialize the whatnext list. Then a loop is entered that scans through the plays list of an actor 312. The first check at step 4803 determines whether the plays list of the actor 312 is empty. If not, then the processing proceeds to step 4804 to retrieve the first or the next member 311 from the plays list and append its whatnext recursively to the whatnext list initialized in step 4802. This looping continues from step 4803 until such time as the plays list is empty, in which case the resulting whatnext list is returned to the calling function in step 4805. It should be noted that the main body of the loop 4804 basically is another point of call for the method to determine whatnext for a given member 311 that will be described in FIG. 49. This is because the plays list of an actor 312 is always a set of members 311.

Figure 49:
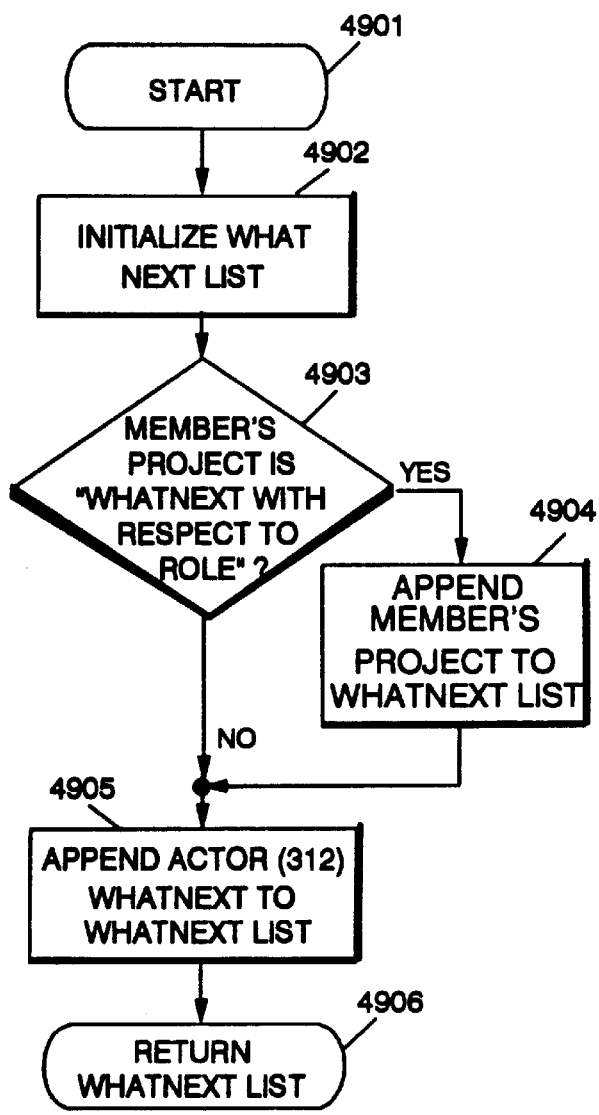
FIG. 49 illustrates a flow diagram of a method to determine whatnext for a given member.

Referring next to FIG. 49, there is shown a method to determine whatnext 2005 for a given member 311. The start of this function at step 4901 is usually invoked by the method to determine whatnext for a given actor 312 as discussed in FIG. 48. The next step 4902 of this process is to initialize the whatnext list to be returned. Then the next step 4903 is to check to see whether the member's 311 project 301 is whatnext with respect to the role 314. This function will be discussed in FIG. 50 as part of a method to determine if a project 301 is whatnext with respect to a role. If this is the case, then the next step 4904 is to append the member's 311 project 301 to the whatnext list. In any case, whether the member's 311 project 301 is whatnext with respect to a role 314 or not the next step 4905 is to append the actors 312 whatnext to the whatnext list. This is the equivalent of the inheritance, in other words, just adding to the function of the parent class of a given member 311, which happens to be actor 312. After this append occurs in step 4905, then the resulting whatnext list is returned to the calling function in step 4906.

Figure 50:
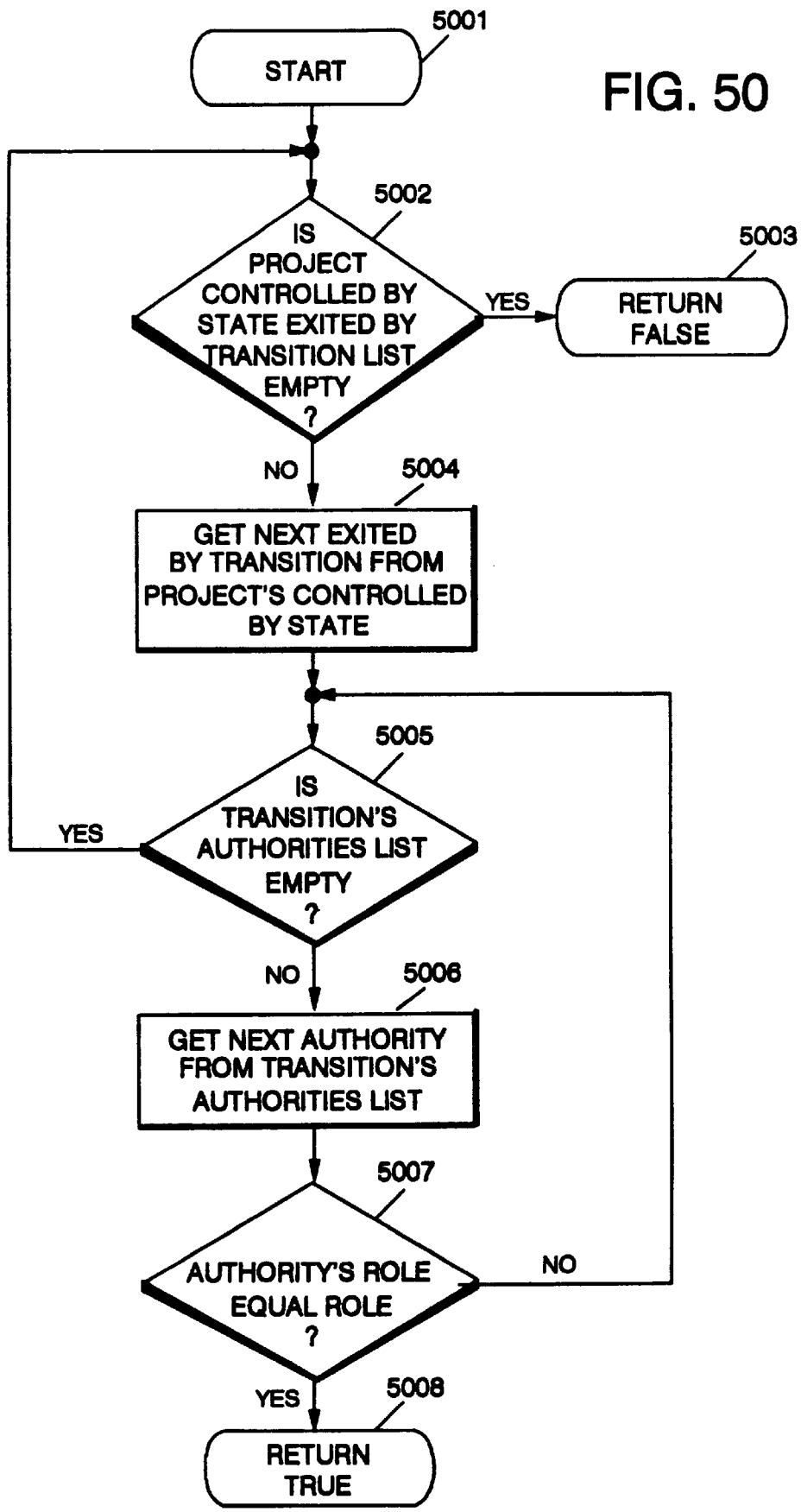
FIG. 50 illustrates a flow diagram of a method to determine if a project is whatnext with respect to a role.

Referring now to FIG. 50, there is shown a method to determine if a project 301 is whatnext with respect to a role (step 4903). When invoked at step 5001, the next step 5002 of this function is to loop through the transitions 306 associated with the current state 305 of the project 301. If this transition list 306 is empty, then the next step 5003 is to return false to the calling function. If there are items in the list of transitions 306 to check, then that next transition 306 is retrieved from the projects controlled by state 305 (step 5004). The next step 5005 is to check if the transitions 306 authorities list 310 is empty. If the list is empty, then the loop returns to step 5002 to scan the next transition 306 in the current state 305 of the project 301. If the transitions 306 authorities list 310 is not empty, then this marks another loop beginning at step 5005 in which case the next authority is retrieved in step 5006 from the transitions 306 authorities list 310. The next step 5007 after step 5006 is to check whether the authorities 310 role 314 equals the role passed in at step 5001 of this function. If this check returns false, in other words the authorities 310 role 314 is not equal to the role passed in step 5001, then the loop through the transitions 306 authorities list 310 returns to step 5005. Otherwise, if the authorities 310 role 314 matches the role passed in at step 5001, then true is returned to the calling function at step 5008 to indicate that the project 301 is whatnext with respect to a role 4903.

In summary, the foregoing describes and shows how the system can be used to provide for a very efficient and integrated system where the processes are just like any other project 301 that can be utilized after they are in the ready or complete state. And the projects 301 have the ability to have a well-defined process 304 or to be somewhat ad hoc, etc. The users have the ability to see the activities that they have executed, as well as projects 301 that they own or have originated. They have a clear method of being able to see what activities are currently awaiting action, which makes it easy for them to focus in on only those projects 301 needing attention. And, a rich definitional structure is implemented that takes the advantage of inheritance to allow for extremely complex process 304 descriptions that are of any arbitrary level of hierarchy and also to take advantage of inheritance through this subclass, superclass arrangement.

With the foregoing hardware in mind, it is possible to explain the process 304-related features of the present invention. To more clearly describe these features of the present invention, discussion of other conventional features is omitted as being apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Since the apparatus for the most part is composed of electronic components and circuits known to those skilled in the art, circuit details will not be therefore explained to any greater extent than necessary for understanding and appreciating the underlying concepts of the present invention.

Although the present invention and its advantages have been described in detail, it should be understood that various changes, substitutions and alterations can be made herein without departing from the spirit and scope of the invention as defined by the appended claims.

What is claimed is:

1. In a data processing system implementing an object-oriented programming language environment, a method of representing a people oriented work environment tool for managing a project, said method comprising the steps of:

modeling said project as an object-like software packet within said object-oriented programming language environment;

modeling a member as an object-like software packet within said object-oriented programming language environment, wherein said member inherits attributes of said project, and wherein said project contains one or more of said member, wherein said one or more of said member is a team;

modeling an actor as an object-like software packet within said object-oriented programming language environment, wherein said project inherits attributes of said actor, and wherein said member is owned by said actor;

modeling a process as an object-like software packet within said object-oriented programming language environment, wherein said process inherits attributes of said project, and wherein said project is defined by said process;

modeling a role as on object-like software packet within said object-oriented programming language environment, wherein said role inherits attributes of said process, and wherein said member is defined by said role;

modeling an authority as an object-like software packet within said object-oriented programming language environment, wherein said authority inherits attributes of said project, and wherein said role has a list of one or more of said authority;

modeling a state as an object-like software packet within said object-oriented programming language environment, wherein said state inherits attributes of said process, and wherein said process contains said state, and wherein said state is a kind of said project;

modeling a transition as an object-like software packet within said object-oriented programming language environment, wherein said transition inherits attributes of said state, and wherein said transition is a kind of said project;

modeling an activity as an object-like software packet within said object-oriented programming language environment, wherein said activity is contained in said project, and wherein said activity is defined by said transition, wherein said transition contains said authority, wherein said authority grants said activity;

modeling a user as an object-like software packet within said object-oriented programming language environment, wherein said user owns and/or originates said project, and wherein said activity is executed by said user, and wherein said user inherits attributes from said actor;

determining if said project is controlled by said state associated with said transition;

if said project is not controlled by said state associated with said transition, then said authority is denied;

if said project is controlled by said state associated with said transition, then a determination is made whether or not said transition has a guard;

if said transition has said guard, and said guard fails, then said authority is denied;

if said guard passes, or if said transition has no guard, then a determination is made whether or not said user invoking said transition owns said project;

if said user owns said project, then said authority is granted, otherwise a determination is made of what active roles said user plays in said team;

if said user does not play any active role in said team, then said authority is denied, otherwise a determination is made whether or not said transition has any of said authority remaining;

if said transition does not have any of said authority remaining, then said authority is denied, otherwise a determination is made whether or not said authority's role is included in said roles played by said user; and if said authority's role is included in said roles played by said user and if a condition associated with said authority is passed, then said authority is granted.

2. The method as recited in claim 1, wherein said process modeled as an object-like software packet within said object-oriented programming language environment is defined by one or more of the following states:

(a) in progress explicit states and transitions;

(b) waiting completion of work product subprojects;

(c) waiting inputs;

(d) a ready state, wherein said states are each object-like software packets within said object-oriented programming language environment.

3. The method as recited in claim 2, wherein completion of state (a) transitions said process to one of states (b), (c), or (d), and wherein completion of state (b) transitions said process to one of states (c) or (d), and wherein completion of state (c) transitions said process to state (d).

4. A data processing system implementing an object-oriented programming language environment, for representing a people oriented work environment tool for managing a project, said system comprising:

means for modeling said project as an object-like software packet within said object-oriented programming language environment;

means for modeling a member as an object-like software packet within said object-oriented programming language environment, wherein said member inherits attributes of said project, and wherein said project contains one or more of said member, wherein said one or more of said member is a team;

means for modeling an actor as an object-like software packet within said object-oriented programming language environment, wherein said project inherits attributes of said actor, and wherein said member is owned by said actor;

means for modeling a process as an object-like software packet within said object-oriented programming language environment, wherein said process inherits attributes of said project, and wherein said project is defined by said process;

means for modeling a role as on object-like software packet within said object-oriented programming language environment, wherein said role inherits attributes of said process, and wherein said member is defined by said role;

means for modeling an authority as an object-like software packet within said object-oriented programming language environment, wherein said authority inherits attributes of said project, and wherein said role has a list of one or more of said authority;

means for modeling a state as an object-like software packet within said object-oriented programming language environment, wherein said state inherits attributes of said process, and wherein said process contains said state, and wherein said state is a kind of said project;

means for modeling a transition as an object-like software packet within said object-oriented programming language environment, wherein said transition inherits attributes of said state, and wherein said transition is a kind of said project;

means for modeling an activity as an object-like software packet within said object-oriented programming language environment, wherein said activity is contained in said project, and wherein said activity is defined by said transition, wherein said transition contains said authority, wherein said authority grants said activity;

means for modeling a user as an object-like software packet within said object-oriented programming language environment, wherein said user owns and/or originates said project, and wherein said activity is executed by said user, and wherein said user inherits attributes from said actor;

means for determining if said project is controlled by said state associated with said transition;

means for denying said authority if said project is not controlled by said state associated with said transition;

if said project is controlled by said state associated with said transition, then means for determining whether or not said transition has a guard;

means for denying said authority if said transition has said guard and said guard fails;

if said guard passes, or if said transition has no guard, then means for determining whether or not said user invoking said transition owns said project;

means for granting said authority if said user owns said project, otherwise means for determining what active roles said user plays in said team;

means for denying said authority if said user does not play any active role in said team, otherwise means for determining whether or not said transition has any of said authority remaining;

means for denying said authority if said transition does not have any of said authority remaining, otherwise means for determining whether or not said authority's role is included in said roles played by said user; and means for granting said authority if said authority's role is included in said roles played by said user and if a condition associated with said authority is passed.

* * * * *